US010530580B1

(12) United States Patent
Walker

(10) Patent No.: US 10,530,580 B1
(45) Date of Patent: *Jan. 7, 2020

(54) ENHANCE INTERACTIVE ELECTRONIC VAULT

(71) Applicant: INTERACVAULT INC., Hartfield, VA (US)

(72) Inventor: Laura Sibley Walker, Hartfield, VA (US)

(73) Assignee: InteracVAULT Inc., Hartfield, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,095

(22) Filed: Oct. 20, 2018

Related U.S. Application Data

(63) Continuation-in-part of application No. 15/701,434, filed on Sep. 11, 2017, now Pat. No. 10,108,811, which is a continuation-in-part of application No. 14/316,637, filed on Jun. 26, 2014, now Pat. No. 9,760,697.

(60) Provisional application No. 61/840,101, filed on Jun. 27, 2013.

(51) Int. Cl.
  *G06F 21/00* (2013.01)
  *H04L 9/32* (2006.01)
  *H04L 29/06* (2006.01)

(52) U.S. Cl.
  CPC ............ *H04L 9/32* (2013.01); *H04L 63/0815* (2013.01)

(58) Field of Classification Search
  CPC .......................... G06F 21/31; G06F 21/6109
  See application file for complete search history.

(56) References Cited

U.S. PATENT DOCUMENTS

| | | | | |
|---|---|---|---|---|
| 6,715,073 | B1 * | 3/2004 | An ........................... | G06F 21/33 380/30 |
| 7,676,439 | B2 * | 3/2010 | Tattan ...................... | G06F 21/32 380/200 |
| 8,327,450 | B2 * | 12/2012 | Clement ............ | G07C 9/00103 713/189 |
| 8,438,382 | B2 * | 5/2013 | Ferg ......................... | H04L 9/321 380/255 |
| 8,886,687 | B2 * | 11/2014 | Browning ......... | G06F 17/30011 707/804 |
| 9,489,397 | B1 * | 11/2016 | Olson ............... | G06F 17/30241 |

(Continued)

*Primary Examiner* — Ali Shayanfar

(57) ABSTRACT

Disclosed herein is a system for enabling secure data storage into a third party managed electronic vault that provides users with a secure location to store important documents, information, and data including but not limited to various forms of personal identifiable information. The system features an interface that dynamically secures, encrypts, and protects data related to transmission, storage, and retrieval, as well as management components that regulate and authenticate access to the contents of the electronic safe deposit boxes (and subdivisions thereof) in the electronic vault. In addition, the system features comprehensive logic for completing and/or auto-filling forms, tracking and/or facilitating renewals of expiring credentials, providing reminders of important dates and events, managing multi-step processes, automatically adjusting security and authentication requirement based on one or more factors, and guiding and suggesting complimentary activities and considerations for detected user events.

20 Claims, 4 Drawing Sheets

(56) References Cited

U.S. PATENT DOCUMENTS

| | | | | |
|---|---|---|---|---|
| 2005/0108096 A1* | 5/2005 | Burger | G06F 21/32 | 705/14.38 |
| 2006/0083214 A1* | 4/2006 | Grim, III | H04L 63/0442 | 370/351 |
| 2006/0229985 A1* | 10/2006 | Lalwani | G06Q 20/102 | 705/41 |
| 2009/0025090 A1* | 1/2009 | Clement | G07C 9/00103 | 726/28 |
| 2011/0137776 A1* | 6/2011 | Goad | G06Q 20/102 | 705/34 |
| 2013/0269006 A1* | 10/2013 | Baron | H04L 63/08 | 726/4 |
| 2013/0290710 A1* | 10/2013 | Broder | H04L 63/102 | 713/168 |
| 2013/0305384 A1* | 11/2013 | Weiss | H04M 1/72577 | 726/27 |
| 2013/0317986 A1* | 11/2013 | Tucker | G06Q 20/1085 | 705/43 |
| 2013/0325479 A1* | 12/2013 | Krueger | G10L 21/00 | 704/275 |
| 2014/0040919 A1* | 2/2014 | Arora | G06Q 10/1093 | 719/318 |
| 2014/0143838 A1* | 5/2014 | Eversoll | G06F 21/6254 | 726/4 |

* cited by examiner

FIG. 1
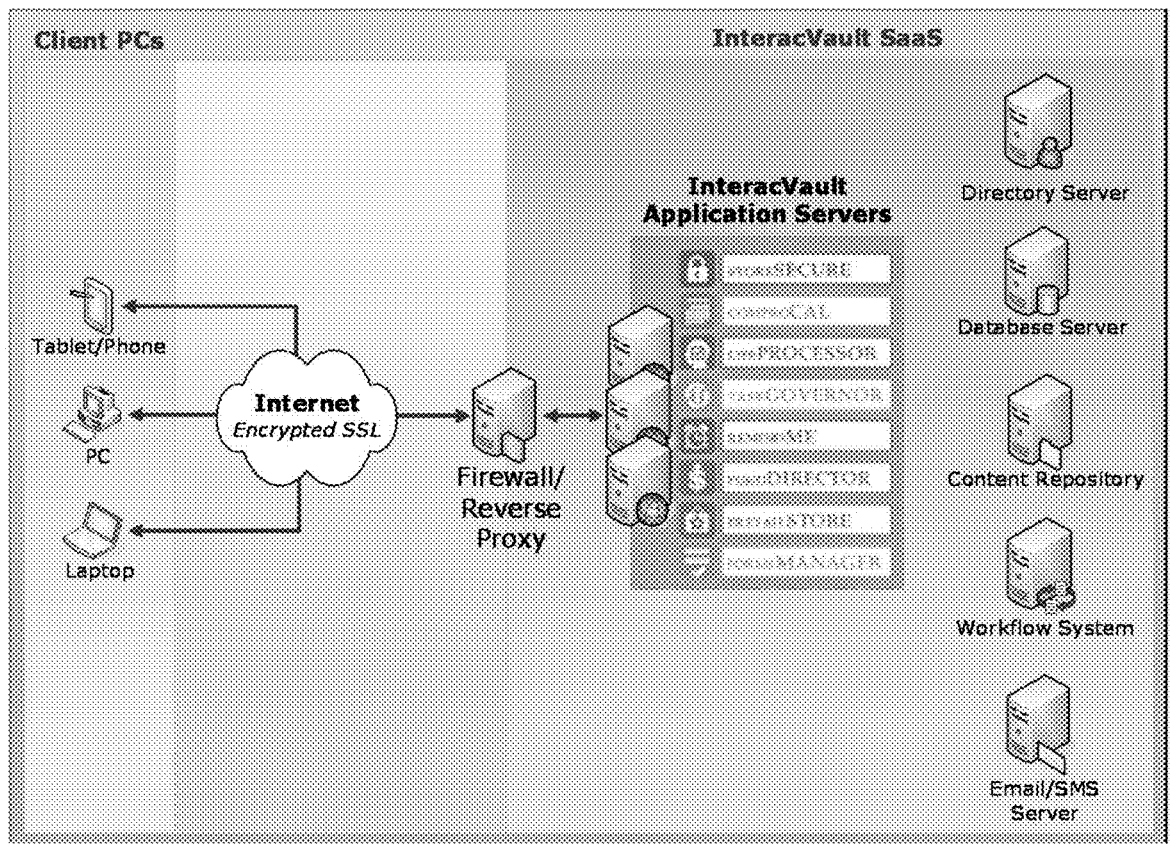
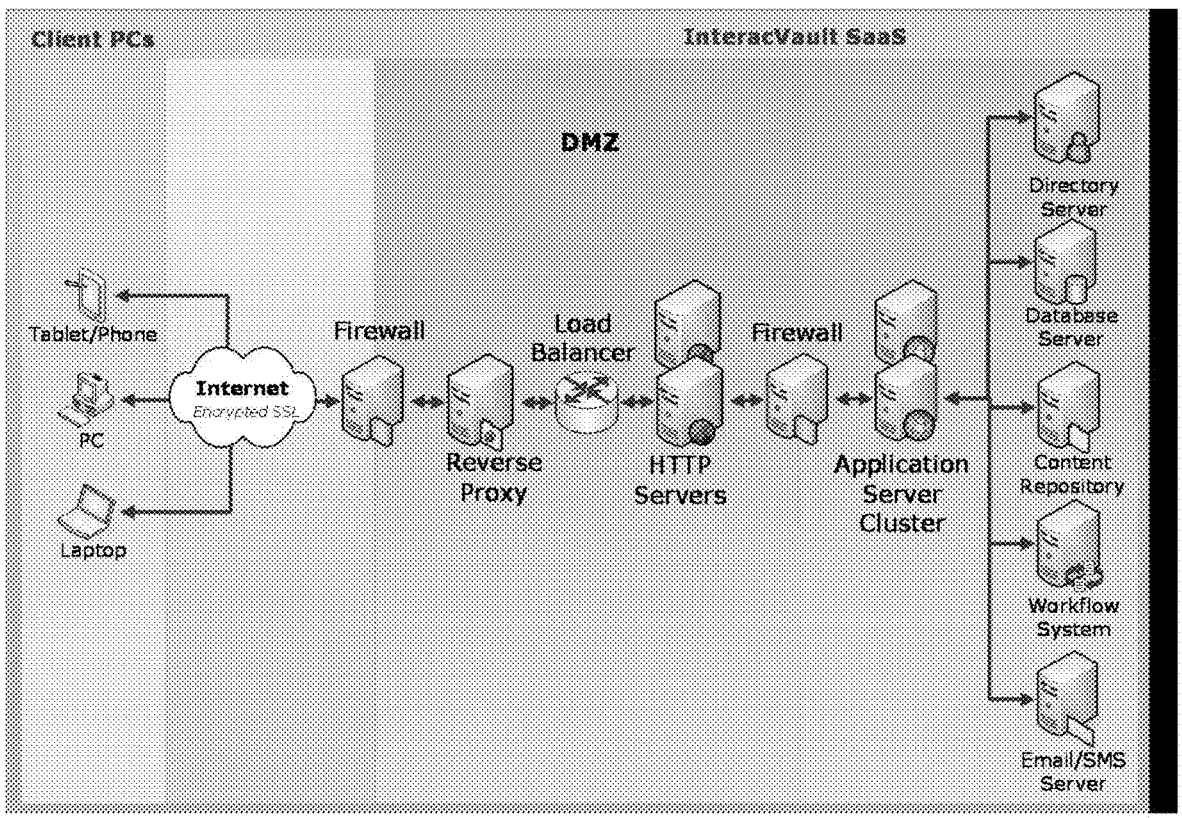

FIG. 2
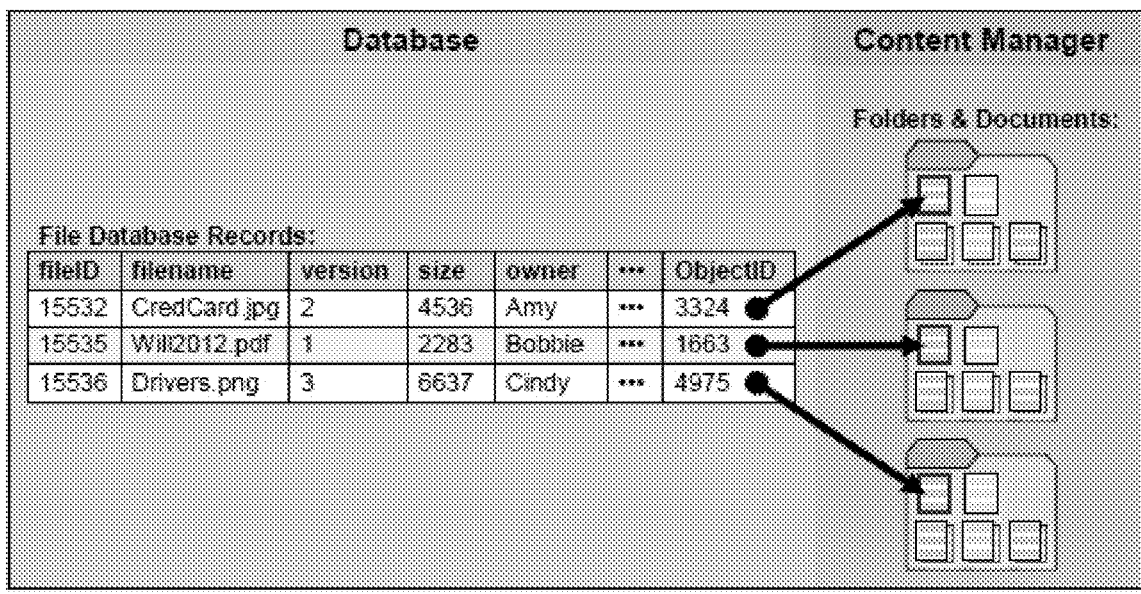
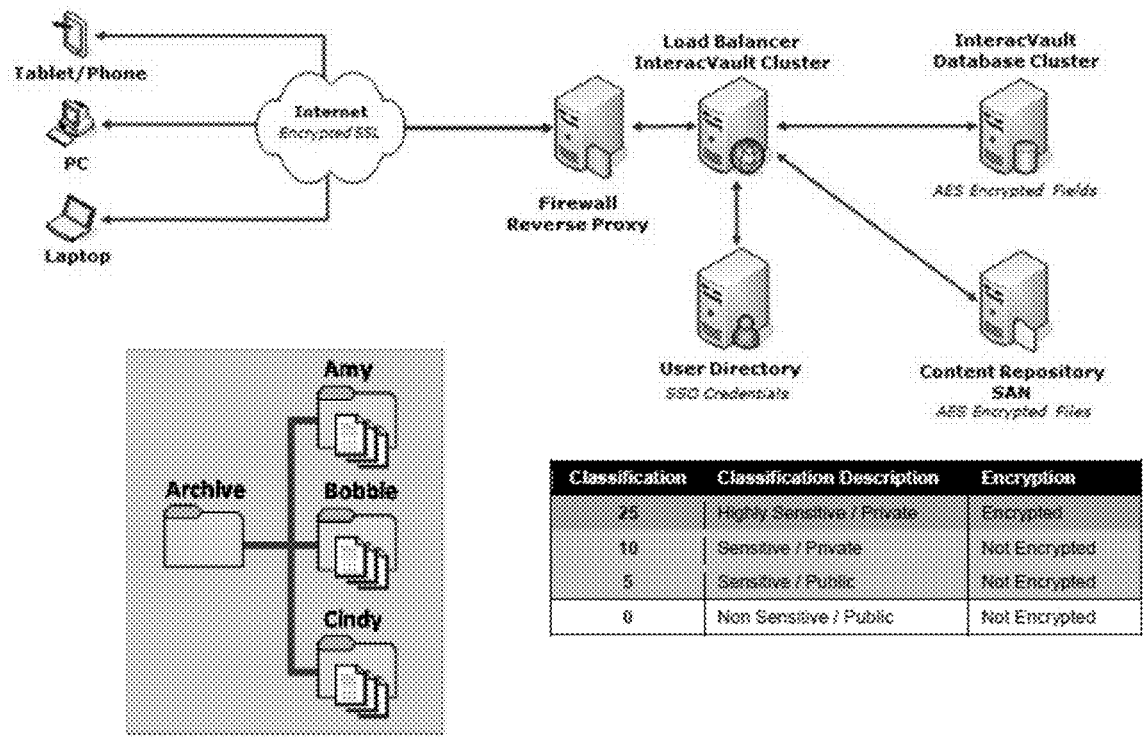

| Database Field | Security Classification |
|---|---|
| Age | Sensitive/Public |
| Bank account number | Sensitive/Private |
| Birthplace | Sensitive/Private |
| Credit card | Highly Sensitive/Private |
| Criminal record | Sensitive/Private |
| Date of birth | Sensitive/Private |
| Debit card | Sensitive/Private |
| Dental records | Sensitive/Private |
| Driver's license | Sensitive/Private |
| E-mail address | Sensitive/Public |
| First name | Sensitive/Public |
| Gender | Sensitive/Public |
| Health insurance card | Sensitive/Private |
| Height | Sensitive/Public |
| Identification card (D/L Equivalent) | Sensitive/Private |
| Last name | Sensitive/Public |
| Mother's maiden name | Sensitive/Private |
| National identification number (SSN, etc.) | Highly Sensitive/Private |
| Passport | Sensitive/Private |
| Password | Highly Sensitive/Private |
| Patient ID number | Sensitive/Private |
| Phone/Fax/Mobile numbers | Sensitive/Public or Sensitive/Private |
| Race | Sensitive/Public |
| Salary | Sensitive/Private |
| Street address | Sensitive/Public or Sensitive/Private |
| Student grades | Sensitive/Private |
| Username | Sensitive/Private |
| Vehicle Identification Number (VIN) | Sensitive/Private |
| Vehicle registration plate number | Sensitive/Private |
| Weight | Sensitive/Public |
| Zip/Postal codes | Sensitive/Public |

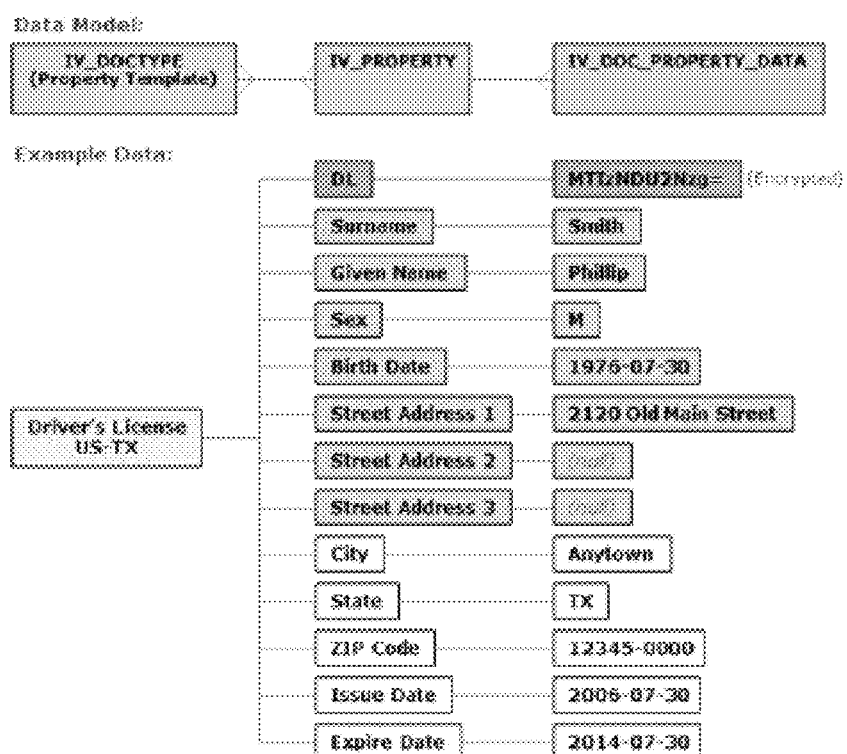

FIG. 3

ENHANCE INTERACTIVE ELECTRONIC VAULT

CROSS-REFERENCE TO RELATED APPLICATIONS

This application is a continuation-in-part of, and claims priority under the benefit of 35 U.S.C. § 120 to, U.S. patent application Ser. No. 15/701,434 filed on Sep. 12, 2017 (to be issued on Oct. 23, 2018 as U.S. Pat. No. 10,108,811), which in turn is a continuation-in-part of and claims priority to U.S. patent application Ser. No. 14/316,637 filed on Jun. 26, 2014 (and issued on Sep. 12, 2017 as U.S. Pat. No. 9,760,697), which in turn claims priority to Provisional Patent Application No. 61/840,101 filed Jun. 27, 2013, the contents of which are hereby expressly incorporated by reference herein in their entirety.

BACKGROUND

Many financial institutions offer customers physical space or "box" in which they can secure valuables such as jewelry, money, and negotiable instruments as well as important documents such as life insurance policies, deeds, wills, titles, and so forth. These physical spaces are generally referred to as safe deposit boxes because such boxes are located within a bank's main vault which provides the primary physical security for the box and its contents. Customers generally pay a fee for the use of safe deposit boxes and often make use of these secured storage spaces prevent loss of the valuable items stored in these boxes that could arise due to fire, flood, theft, unintentional misplacement, natural disasters, or other undesired situations.

Additional safeguards may also be utilized to ensure the safety and security of the contents of the safe deposit box. For example, a two-key system may be used wherein the customer, upon proof of their identity, possesses a unique key for the box that works in combination with the financial institution's master key to gain entry to the box and access to the box's contents. Of course, given modern advances in security technology, many banks are also incorporating newer technologies to enhance the physical security and further restrict unauthorized access to safe deposit boxes. For example, many banks may use physical biometric authentication technologies to measure and analyze human physical characteristics in order to further validate the identity of the customer for authentication purposes. Fingerprints, retina scans, facial feature recognition, and so forth can also be used to confirm identity of the box owner and thereby restrict entry to unauthorized personnel based on physical features and/or characteristics unique to the customer.

The ability to store information electronically has changed the way we access and use information. For example, the Internet allows users to access, share, send, receive, execute, and destroy electronic documents from remote locations. As a result, important information such as credit card numbers, traveler cheque numbering, or detailed passport information can be stored electronically and accessed in the case of emergency from any location featuring Internet access. These documents, however, must still be protected to prevent unauthorized people from gaining access to the sensitive information therein.

Consequently, in addition to the aforementioned physical solutions for protection and security of high value documents and other items, several attempts have been made to provide an electronic equivalent of the bank safety deposit box for storing and securing customer copies of documents and other sensitive or private information. Many of these attempts have focused on the archiving, retrieval, and use of electronically-stored information (data, documents, etc.) such as bank records, account statements, insurance policies, tax returns, legal agreements, and other writings that permit access by the customer via a secured connection over an open network, as well as recording and reporting the access to and activities performed with such electronically-stored information, data and documents. Other attempts have also been made to provide document sharing, delivery, and execution via electronic means to gain benefits and efficiencies not possible with traditional mail, overnight delivery, private courier, hand delivery, facsimile, or email as these existing approaches have inherent disadvantages and shortcomings (e.g., cost, labor-intensive, slow, and/or insecure).

However, past attempts at providing electronic document storage and protection have been largely unsuccessful due to the inability of these systems to balance security with ease of access, as well as failing to provide any features or conveniences that help ensure not only the security of the stored files but also the continuing validity of the information, data, and documents represented by those files.

SUMMARY

Various implementations disclosed herein are directed to an electronic safety deposit box comprising a memory and a hardware processor for: receiving and storing at least one item of electronic data in the electronic safety deposit box for a user; determining a current level of security for the electronic safety deposit box and a set of corresponding credentials necessary for the user to access the electronic safety deposit box, wherein the corresponding credentials comprise at least one dynamic credential that changes with each access attempt; prompting the user to provide the set of corresponding credentials for access to the electronic safety deposit box; validating that the user is authorized access to the electronic safety deposit box and to the at least one item of electronic data stored in the electronic safety deposit box; and granting access to the at least one item of electronic data in the electronic safety deposit box.

Various alternative implementations disclosed herein may also be directed to electronic vault systems for secure storage of electronic data, these systems comprising one or more of the following features: a user interface for enabling a user to interact with the system via a communications network; an identification module for identifying the user; a validation module for validating the user's access to and permissions for at least one electronic vault based on a dynamic security level for each of the at least one electronic vaults; at least one electronic safe deposit box for storing electronic data corresponding to a specific customer; a storage module for storing electronic data in the at least one electronic safe deposit box; a retrieval module for retrieving electronic data stored in the at least one electronic safe deposit box; and a smart module for performing at least one supplemental service from among a plurality of supplemental services comprising sending a reminder, send a renewal notice, performing a renewal, and performing a recommendation.

This summary is provided to introduce a selection of concepts in a simplified form that are further described in the materials included herewith. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is more fully understood when read in conjunction with the drawings provided herewith and the appended drawing described below. For the purpose of illustrating the implementations, there is shown in the drawing(s) example constructions of the implementations; however, the implementations are not limited to the specific methods and instrumentalities disclosed. In the drawing(s):

FIG. 1 is a first collection of graphical information related to various implemenations;

FIG. 2 is a second collection of graphical information related to various implemenations;

FIG. 3 is a third collection of graphical information related to various implemenations.

DETAILED DESCRIPTION

Figure 4:
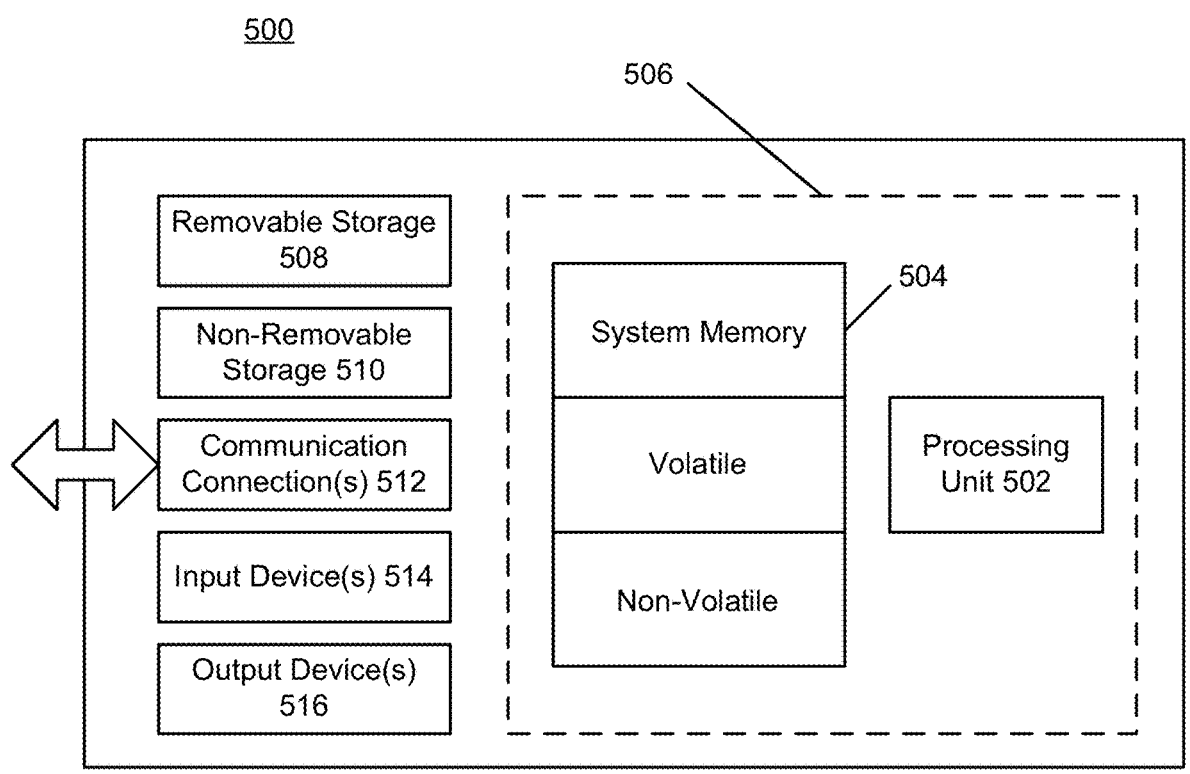
FIG. 4 is a block diagram of an example computing environment that may be used in conjunction with example implementations and aspects disclosed herein.

As disclosed herein, an electronic vault (EV) system may comprise one or more electronic safe deposit boxes (ESDBs) to provide means for storing electronic files representing written information, data, and other documents on a customer by customer basis, and to secure these files by enabling only the specific customer for that ESDB to access the files therein upon sufficient confirmation and validation of the customer's identity. In a simple system, each customer may have a unique user identification, password, and personal identification number ("PIN") that provide the user with access to the electronic files contained in their ESDB. In addition, authentication mechanisms employed by the EV system might also include a rendering component capable of recreating documents from the customer's ESDB to the customer in a legally presentable and/or electronically notarized form.

An EV system may also allow the customer to designate third party delegates to access all or a portion of the contents with the ESDB on the customer's behalf. The delegates may only have specific permissions such as viewing or printing specific documents but have no ability to modify or delete such documents, depending on the specific access permissions granted to the delegate by the customer for the specific document. In addition, the system may also track the activity of delegates within the customer's EDSB and provide automatic notification to the customer when a delegate accesses the ESDB as well as detail the actions performed by the delegate while in the customer's ESDB. The EV system may also provide means for compartmentalizing written information, data, and other document files into predefined and/or user defined groups or compartments for easier management by the customer when providing access permissions to delegates for several related files at a time.

The EV system itself may be stored in a secure location controlled by a third party such as a financial institution or other commercial depository featuring strong physical security over the EV system components (i.e., the storage devices and processing equipment). It will be appreciated that certain institutions specializing in information security and EV system operations may in fact have or develop a trusted reputation among users who are thereby more likely to become customers and entrust their most sensitive personal data, documents, and other sensitive information to these storage locations.

Generally, the EV system may include an interface component and a management component which provide users access to the contents of an ESDB. In operation, a customer or other entity with access permissions may then transmit data, documents, and other sensitive information by way of the interface component to the ESDB to the extent permitted by the customer and monitored and controlled by the EV system management component. The interface component may provide secure transmission capabilities using, for example, the SSL (secure socket layer) protocol to help protect the customer's data during transmission. In addition, the interface component may provide encryption capabilities and digital signature services for enhanced security, authorization, and execution. Moreover, although the interface component and the management component may be implemented as separate and distinct components, it is to be understood that these components (and all others described herein) may instead be co-located and that multiple interface components and/or management components may be employed in a single component to integrate and facilitate storage/retrieval services in connection with the ESDBs provided by the EV system. Regardless, an EV system provides a trusted, secure, and heavily protected storage service whereby customers can store electronic information with security not available with conventional remote backup systems.

The features, functions and benefits of EV system can be employed in many scenarios, including but not limited to business-to-business (B2B), business-to-consumer (B2C), business-to-government (B2G), consumer-to-government (C2G), and consumer-to-consumer (C2C) environments. In the B2C context, for example, an EV system may provide auto warranty storage and expiration notification, insurance assets inventory services, instant asset inventory document storage for goods purchased, and so forth. In the B2G context, for example, an EV system may provide for Internal Revenue Service (IRS) audit reporting services, document recovery and certification, legal documentation recovery and certification, etc. In the C2G context, an EV system may provide for automatic mail storage via electronic means, automatic filter of junk mail, and other services. Of course, while specific examples are described herein, other examples exist that are to be included within the scope of this disclosure and claims appended hereto.

Such an EV system may also provide assistance in the recovery of sensitive information that is lost or damaged due to unforeseen events. For example, the recover of identification, checking account, and home insurance information can assist customers in recovering from life-altering events such as natural disasters, fire, and theft, for example. Although critical documentation and information may be lost or destroyed, the ability to maintain a readily-accessible copy of critical documentation, information, and other data can help protect a customer from treble effects stemming from unforeseen disasters by providing a proactive solution to ensuring that key information is protected, secured, and immediately accessible.

A SmartVault system is an EV system that not only secures and protects a customer's sensitive document, information, and data, but also provides the customer with several enhanced features including but not limited to "remind," "review," and "renew" as discussed herein. Featuring a dynamic and flexible task management system, the SmartVault system helps customers prevent having a document expire or become outdated by providing a suite of services to access and process identification, legacy, medical, insurance, legal, educational, and financial information for the customer as well as the customer's spouse, family, employment, assets, and interests.

GENERAL TECHNICAL DETAILS

Since the inception of identification, a checking account, and a home insurance policy, governments, banks, and insurance companies had little or no answers to get clients back on track after life-altering disasters occurred. The lack of critical documentation because it was destroyed in these natural disasters left victims exposed and displaced for weeks, month and sometimes years. There is a significant need for one's critical documentation to be secured and available on-line! The impact of natural disasters on economic well-being and human suffering has increased alarmingly as the human condition becomes more sophisticated and costly. Again and again in recent history, we have witnessed an overwhelming disaster unfold and helplessly watch as numbers of people have been displaced from their homes and belongings. In general, disaster responses have tended toward the reactive and tactical, when a proactive and strategic approach would have had longer-term benefits. The financial cost of responding to the most recent events has stimulated particular interest in creating a globally available product suite that supports down to the local level to proactively respond to this crisis. The result of producing technology that helps to rebuild after a disaster has enhanced recovery time and costs savings. To the individual, disasters are personal. Unable to escape hurricane Katrina, a wallet in the pocket of her victim who swims out of the flooded Bourbon Street in New Orleans to safety would be the difference of instant identity vs. emergency shelter just sustaining until one is reclaimed with documentation. To a traveler on a business trip in front of a car rental counter in need of a vehicle suddenly learns that their driver's license has expired two weeks earlier and cannot process the rental agreement for the car feels equally vulnerable in that moment! That poor man who comes in the door at the end of a long, work day empty handed, only to be greeted by his beautiful wife, handing him an anniversary gift that he completely forgot about is devastating to him. As these images conjure personal memories that made one susceptible, SmartVault products solve all of these challenges with smart document management tools of renew, review, and remind with proper reward and our process delivery is seamless and effortless because it is customizable and dynamic to the user. Once critical documentation is securely added to our system, event after event, year after year, this tool will simplify life, effortlessly assist you in getting things done, and you will never be exposed again.

Everything humans do in our fast paced world starts with a piece of paper. Our lives are a succession of document retrieval, management, date notation, action, completion, related item attachments and storage. The purpose of SmartVault is to secure, remind, review, and renew all documentation necessary with the related items and documents in digital "hand" to keep our user's prepared and simplify life's GTD's (getting things done). Our dynamic and flexible task management system makes life processes easy and effortless! Our process is what identifies us as 'unique' within the store-in-one-place, cloud SaaS industry. We are not one of the countless virtual storage bins, our customers will never have a document expire or become outdated. Our customers will always be empowered in their tasks with related documentation, relevant items, issuing or purchasing institution information, and customized appropriate timeline delivered to choice email, text or IM. Always and with ease, our clients will keep their life's GTD's current and completed on time. Our sophisticated suite of products provides access and in-processing to identification, legacy, medical, insurance, legal, educational and financial information for the client, spouse and family, secured to the item. Our clients will mitigate risks and start rebuilding instantly what is about to expire or worse, lost. Whether they lose their wallet, their house, or the unimaginable, a loved one, SmartVault virtual containers will insure that customer's critical documentation and contents are available in seconds, anywhere there is with an internet connection so that recovery is only a click away. Our client's home is typically their single largest investment, and our personal content inventory container keeps up with belongings, insurance policy and riders, home maintenance and improvements. Their families most precious, irreplaceable items are picture collections of life moments, and family picture albums are secure, available and actively manageable.

How do we get people to use the system? Our checklist technology! We have custom, preloaded checklists and checklists that the customer can create on their own. Our "On the Move" custom New Member checklists will gently walk a new user step by step from novice to seasoned user with 2 to 3 simple tasks a day. As the uniformed personnel steps through their tasks, the details requested will build wizard military forms for the following military life transition events: (1) PCS; (2) Deployment; (3) PCS Stateside; (4) Separation from the Military; and (5) Civilian.

Quick wizard step logic skits will direct the user to learn about the system as-they-go, and by the end of each move sequence, all the forms required to make these moves will be filled out with instructions on where is submit before the deadlines, and all money owed from the military will be estimated down to the pennies for ultimate advance with minimal to no repayment. The timeline of tasks is flexible and dynamic, and the uniformed personnel can re-assign tasks to their shared loved ones. Because the system is secured down to the file, sophisticated security privileges shares what the member wants, and secures those files 'for their eyes only'. All personal content, legal, legacy, id, medical, tax, housing, school information, spousal employment, auto, insurance and finance management will be address, filed, and set with review and renew dates. Once the military or civilian member 'makes their move', every event in life will be organized, easily retrieved, and effortlessly managed.

Our Welcome to SmartVault! Custom New Member Checklists will gently walk a new user, step by step from novice to seasoned user in less than 90 days! Wizard step logic will assist the user so that time in the system is just minutes at each interval! The timeline of tasks is flexible and dynamic, and the client can re-assign tasks to their shared loved ones. Because the system is secured down to the file, sophisticated security privileges shares what the member wants, and secures those files 'for their eyes only'. All personal content, legal, legacy, id, medical, tax, housing, school information, spousal employment, auto, insurance and finance management will be address, filed, and set with review and renew dates. Once the military or civilian member 'makes their move', every event in life will be organized, easily retrieved, and effortlessly managed.

The very reason we are in business is to enhance our client experience in a confidential and ethical way. Our business model employs a strategic business alliance as an entrusted, professional banking and insurance OEM. We are a service provider client accessible as a button interface on the back wall of an entrusted and talented financial/insurance institution's website to protect their member's critical documentation. Unlike antiquated brick and mortar security bank boxes, the financial institution can provide a leading edge virtual box that the bank can profit from as a new product offering. This exceptional service affords a member worldwide retrieval the documentation that traditionally was only accessible in one location. That is just the baseline of convenience and service! In addition to the ease of accessing data worldwide securely and safely; we at SmartVault using our own special processes within our integrated product suite will provide effortless renew, review, and reminders of our expiring documentation, a family outing, a social meeting, and our most special gift giving occasions. Our rewards not only enhance and save money for our clients, our OEM Partners benefit as well: a lucrative ROI Matrix that calculates 3 fold: (1) SaaS-monthly subscription that targets the client congregation of our OEM Partner; (2) recommend technology to up-sale across the product brands with our Active Analytics; and (3) redundant storage and defer risks by being responsible for all data stored within SmartVault and the OEM Partner is not responsible for the security and can benefit from a soft dollar savings with the redundant storage of their data.

The UNIVERSALWORKSPACE application portal provides the foundation for the STORESECURE, LIFEPROCESS and REMINDME products. The portal provides common services such as secure login and logout services, real-time support chat service, context sensitive online help, powerful search capability and a user profile where a user can specify preferences and share settings.

Once a user is authenticated the first thing they see is the SmartVault dashboard. The dashboard home page provides all kinds of useful information, news, promotions, usage statistics and reports, displayed in a customizable "at a glance" easy-to-use user interface. From the dashboard home page the user can navigate to the STORESECURE and LIFEPROCESS products.

Users can access a number of common functions that are available in all SmartVault products by clicking the corresponding icon on the main toolbar: Customer Support Real-time Chat; Portal Search; User Profile/Share Settings; Online help; and Log out.

If the SmartVault portal is accessed from being logged into a member site, basic users will be automatically logged into the portal using their Single Sign-On (SSO) credentials. Power users may be required to enter secondary credentials or utilize an authentication token emits One Time Passwords (OTP) in addition to their SSO credentials. If the SmartVault portal is accessed directly, the user will need to authenticate by entering their credentials into a logon page.

The portal uses an innovative risk based authentication where the member starts out with basic authentication. As the individual adds sensitive or Personally Identifiable Information (PII) to the application, the system reassesses and automatically increases the security sufficient to the level of risk. As the risk level increases, the more complex the authentication required to authenticate the user. Casual users with minimal sensitive document can log into the system with basic authentication using a Single Sign-On token (or simple username/password if application is standalone). Users who manage all of their sensitive life documents will log in using two-factor authentication, which consists of the base username/password authentication (something the user knows) with a physical authentication device (something the user has) that generates a One Time Password (OTP).

To help a user with the initial setup and to ensure that the user never starts with a blank page, the Initial Setup Wizard guides the user. The very first time a user logs into the SmartVault portal, the Wizard is automatically launched. The wizard interviews the user to collect personal information, family information, preferences, security questions and sharing settings. The wizard initially configures the following settings: Standard personal user information (e.g. first, middle, last name, sex, birth date, birth place, address, phone numbers and e-mail address); Names of family members and their relationships and power of attorney to establish special groups that can be used for sharing; Location information (e.g. State/Province); Type of user (e.g. Civilian or Military, student or employed and occupation type); internationalization and localization (e.g. Time zone, date format, number formats, quotation symbols, currency and language settings); Security settings (e.g. challenge-response questions); Sharing settings (e.g. initial sharing settings); Notification settings (e.g. mobile phone number for SMS and email addresses); and Portal personalization settings (e.g. dashboard layout and content and portal theme).

The user profile information is used to initially configure the system so the user never starts with a blank page. It uses the information to setup which navigation containers are visible, configure placeholder templates for national identification numbers and State/Province identification, and setup initial file sharing capability. All user information is saved to the User Profile/Share Settings page and can be modified by the user at any time.

The SmartVault portal provides real-time customer support using a Web-based chat client with passive browser screen sharing capability. Clicking the Customer Service Chat icon on the main toolbar opens a support chat window. The chat window allows you real-time access to talk with a customer support person to ask a question or to discuss an issue. At the bottom of the chat window support phone numbers are provided. If further interaction is required, screen sharing can be established to allow the customer support person to see what the user is doing or review the documentation or form in question. They can even assist the member in digital signature authentication discussed in our Initial Setup Wizard.

The portal search is available across all applications and can be used to quickly locate a document, task or event. Clicking the Portal Search icon on the main toolbar opens a basic search window. The search uses free text (similar to a web search engine) to search for a document, task or event. The search engine supports "AND", "OR" and "NOT" logic operators and wild card characters. Basic search capability searches all document/task/event template metadata, attachment file names and associated notes and keywords. The user can specify scope of which product to search in or can choose to search across all products. At the bottom of the window is the "Advanced Search" link which enables the ability to specify additional search criteria such as date ranges, document types and document size. The search also provides full (PERL) regular expression pattern matching.

The user profile and sharing settings can be used to change user profile information, application settings and sharing permissions. Clicking the User Profiles/Sharing Settings icon on the main toolbar opens the profile window. From profile window, the user can edit their user profile and sharing settings by clicking on the "Edit Profile" link. If user has ability to access other user's documents and tasks (i.e. another user has shared documents and tasks with the user), then each user that can be accessed is listed below the currently logged in user. Clicking on another user's profile will allow the user to see documents, tasks and events that user has permission to access. The user profile saves user settings, preferences, security and sharing settings: Standard personal user information (e.g. first, middle, last name, sex, birth date, birth place, address, phone numbers and e-mail address); Names of family members and their relationships and power of attorney to establish special groups that can be used for sharing; Location information (e.g. State/Province); Type of user (e.g. Civilian or Military, student or employed and occupation type); internationalization and localization (e.g. Time zone, date format, number formats, quotation symbols, currency and language settings); Security settings (e.g. challenge-response questions); Sharing settings (e.g. initial sharing settings); Notification settings (e.g. mobile phone number for SMS and email addresses); and Portal personalization settings (e.g. dashboard layout and content and portal theme). All user information in the User Profile/Share Settings page and can be modified at any time.

The dashboard home page is the first page that a member sees once they have logged in. The page provides useful information, targeted promotions and advertising, usage statistics and event log. The layout of the dashboard is customizable and can be configured in the user profile page. From the home page the member can navigate to STORESECURE and LIFEPROCESSOR. The dashboard contains useful information and tips on using SmartVault products, benefits of storing and managing the member's life documents, home inventory, calendar events and TODO tasks in SmartVault products, privacy and security best practices, as well as useful 3rd party articles on securing, simplifying and organizing member's life. The dashboard contains a couple of sections that prominently display targeted special offers, promotions and advertising that is useful to the member. Often these are advertising for banking or insurance or military support services.

One of the most useful sections of the portal is the user statics section where the member can see all of their usage statistics "at a glance". The usage information includes: Items created this year; Items created this month; Items created this week; Items created today; Total items created by container; Total items created overall; Pie chart of total items created by container; Line graph of items created this year; Files uploaded this year; Files uploaded this month; Files uploaded this week; Files uploaded today; Total files uploaded; Pie chart of total files by file type; Line graph of total file uploaded this year; Tasks created this year; Tasks created this month; Tasks created this week; Tasks created today; Total tasks created; Line graph of total tasks created this year; Calendar events created this year; Calendar events created this month; Calendar events created this week; Calendar events created today; Total calendar events; Line graph of total calendar events created this year; disk space used; disk space free; Total Disk space available; and Line graph of total file size in bytes uploaded this year.

The dashboard event log shows the last 25 actions/events that occurred in the member SmartVault account. Events include additions, modification or deletions of items, uploaded files, tasks, notes, etc. If a member wishes to see more than 25 actions, they can click on a link that provides access to the Event log report that shows all events for a specified period.

The STORESECURE product provides the user with the capability to store and manage their critical life documents in an organized, secure, and highly accessible cloud storage application. It is essentially a bank security box that you can access anytime from anywhere in the world. However, unlike a security box where documents could easily expire over time, STORESECURE helps the user to ensure that stored items are always kept current through the use of renewal and review tasks, which have reminder notifications to ensure the user is always aware of any upcoming document expiries. The STORESECURE screen is split vertically into three window panes.

The left pane is the Navigation pane which provides the user with the ability to navigate and manage item containers. Each container is represented by an intuitive icon, and container name. Clicking on a container in the Navigation pane will display the contents of the chosen container in the middle pane. When the user first accesses STORESECURE, the system will display a list of default containers based on the user profile settings that the user specified in the Initial Setup Wizard. In STORESECURE the user is able to manage their list of containers; adding, or removing* containers as they please. An "x" found in the top right of the container icon will allow deletion, and an "Add container" button found at the top of the list will allow the user to add another. When adding they will be allowed to add a container from a pre-defined list or create a generic aggregate container. Aggregate containers are discussed further in the Container Contents Pane section below. (Depending on user profile settings, some containers may be considered to be core containers and will not be removable.)

The middle pane is the Container Contents pane which displays the items found within the selected container. There are two basic types of containers: aggregate and collection. The pane can be maximized or returned to its traditional size by clicking on the maximize button at the far right top corner of the pane. Clicking it again will return the pane to its traditional size. Aggregate containers contain many different item types that share a common theme. The items are grouped by category to make managing all these items easier. For example, a Wallet aggregate container may contain different Item Categories such as "Driver's License", "ID Card", "Debit Card", "Credit Card", and "Loyalty Card". There may be many Items within each Category. For instance, the Loyalty Card category may contain "Hilton Rewards Card", "Marriott Rewards Card" and "Priority Club Card". The layout for the aggregate container view is consistent for all containers of this type and is completely data driven. Item Categories can be added to and removed from an Aggregate Container to suit the user's needs. When the user selects an aggregate container from the Navigation pane, the Container Content pane's title is updated to reflect the selected container name, and all of the type categories for the container are displayed. The categories are displayed in a grid pattern of boxes, and the top, left box is reserved for an "Add a new category" button. Each of the actual category boxes contains an "image stack" and the category name. If the category contains items the surrounding box will be solid, and dotted if it is empty. If the category contains multiple items, the stack will appear as a stack of images and it will display the thumbnail for one of these items. If the category contains only one item, it will appear as a single image stack. If the container contains no items an icon for the category will display in place of the image stack.

An item container can either be in a closed or open state. Only one container can be open at any given time. To open a category, the user simply clicks on the category. This will display an embedded frame below the row the selected category is in within the category grid. This frame will take up the full width of the pane and provide as many rows as is needed to display the items in the category. A triangle icon is used to indicate which of the categories in the row above is "open". Like the main pane, the "open category" frame uses a grid pattern of boxes to display the items in the category. The top left box is reserved for an "Add a new item" button. All other boxes represent items in the category. These boxes contain a thumbnail image for the item, followed by the item's description. If the item does not have an attachment, the system will use a generic document icon. Otherwise, the thumbnail will be that of the attachment that is flagged as being the item's primary attachment. Double clicking on an item will open the primary attachment. If the attachment is an image, it will open in a modal dialog. If the attachment is not an image, the attachment will be returned in a way that will allow the user to either save or open it (using the browser's default viewer).

Categories and Items can be deleted by clicking an "x" that is displayed in the top right corner of the category/item's box when the user's mouse cursor hovers over the category/item. If a category contains items then this "x" will not be available. If an "x" is clicked the user is prompted with a warning message before actually deleting the category/item. When the user clicks the "Add a new category" button, the user will be prompted with a modal dialog containing a list of all possible item categories. Likewise, clicking "Add a new item" will display a modal dialog that allows the user to select from a list of item types that are valid for the chosen category. In addition to choosing an Item Type, the user is required to provide a description for the item, and add an optional file attachment to the new item. This attachment will be flagged as the default primary file for the item, and serve as the thumbnail for the item.

A collection container is a collection of items of a specific type with a very specific user interface layout. Collections can be thought of as mini applications that operate within the context of the STORESECURE. For example, the password vault collection stores and manages password, the photo album collection stores and manages photos, and contact manager collection stores and manages personal and business contacts. These item types have specialized views to allow the user to easily sort, search, and manage these collections.

The right pane is the Item Details pane which displays the details for the item currently selected in the Container Contents pane. The Item Details pane is broken up into the following tabs: Properties, Attachments, Notes, and (optional) Renewal/Review Tasks. The pane can be maximized or returned to its traditional size by clicking on the maximize button at the far right top corner of the pane. Clicking it again will return the pane to its traditional size. The properties tab lists all of the selected item's properties in a vertical list. The properties that are displayed are based on the item's type. This means that the properties displayed for a Credit Card will differ greatly from that of a Last Will & Testament. The only properties common to all items are: Item Type; Description; Creation Date; Renew or Review Date; Issuing Organization Name (if issued card or certificate); Issuing Organization Phone (if issued card or certificate); and Issuing Organization Website URL (if issued card or certificate). The properties that are based on the Item Type appear below these common properties. To dynamically build this section of the Properties Tab the system takes data for each property, such as label, data type, order, minimum value, maximum value, maximum length, and format templates, and determines what input is required. This could result in generating anything from a simple date field to a date picker with a minimum date requirement. If the Item Type defines an Expire Date property, such as passport expiry date, the Review Date common to all items will not be displayed. The Expire Date is rendered as a date picker followed by a "Create Renewal Task" button. Clicking the Renewal Task button will create and associate a new task with the item. This task will automatically be scheduled using the item's expire date, and populated with information about the item to make renewing the item a snap. The new task is displayed in the Item Details pane as a new "Renewal Task" tab but will also appear in the LIFEPROCESSOR Daily Task list on the desired deadline date. Similarly, the Review Date allows the user to create a recurring Review Task for the item so that they will be reminded to review the item on a regular basis (every 4 years, monthly, etc.).

The attachments tab displays all of attachments associated with the current item and lists them in a table. The system displays each attachment's filename, date, and actions that can be performed on the attachment. Actions include: Setting the attachment as the item's primary file; Downloading the attachment; Uploading and updating a new version of the attached document; View the history of all attachment revisions; and Deleting the attachment. An "Add Attachment" button at the top of the page allows the user to add a new attachment to the item. If the selected item has attachments, the tab's title will contain a badge that displays how many attachments there are.

The notes tab displays any notes a user entered for this item. This screen is split into two parts; a note history and an area to enter new notes. The notes history includes the author and date of each note, and lists the notes in chronological order (newest first). If the selected item has notes, the tab's title will contain a badge that displays how many note entries there are. Share profile users who are making notes on documentation will be identified in the notes autograph. The notes tab can expand by clicking on the maximize button at the top right hand corner of the pane. Additionally, if the user holds the right mouse button down over the expand note expander in the notes window, the notes tab will grow to the size of a replica real life note pad. Clicking on the same button at the top right hand corner of the pane again will minimize the pane back to its original size.

The task information displayed in the Renewal/Review Task Tabs is identical to what is displayed for a task in LIFEPROCESSOR. The only addition is a delete button in the top right corner of the tab, which allows the user to delete the task from STORESECURE directly. Upon renewal and review of an item completed in LIFEPROCESSOR, the new content will populate the item with the current data. All previous data including the property tab content, attachments, and notes will be stored in a history tab located as a 5th tab in the item details pane. This tab will only appear if the renew or review item has been an expired or updated review information in the item.

STORESECURE provides preview thumbnails for the following file formats: Microsoft Office (.DOC, .DOCX, .XLS, .XSLX, .PPT, .PPTX); Adobe Portable Document Format (.PDF); Text files (.TXT); Image files (.JPEG, .PNG, .GIF, .TIFF, .BMP); Scalable Vector Graphics (.SVG); PostScript (.EPS, .PS); Video files (WebM, .MPEG4, 0.3GPP, .MOV, .AVI, .MPEGPS, .WMV, .FLV).

The Education aggregate container is provided to store all documentation relating to education. Default item categories are: School Information; Transcript; 529 Plan; Bursary; and Award.

The Financial aggregate container is provided to store documentation related to accounts and cards held with financial institutions. Default item categories are: Credit Card; Debit Card; Car Loan; Mortgage; Equity Line of Credit; Personal Loan; Deployed Savings Accounts; Savings Account; 529 Plan; Investment; and Retirement.

The Identification aggregate container will capture all important documents related to the user's identification. Default item categories are: Birth Certificate; Passport; SSN; Military ID; Driver's License; DPOR; Health Services; Bar; Student; and Pictured ID.

The Insurance aggregate container provides a place to store insurance papers. Default item categories are: Medical Insurance; House Insurance; House as a Rental Insurance; Renter's Insurance; Vehicle Insurance; Pet Insurance; and Life Insurance.

The Legacy aggregate container captures all data related to the legacy of the user. Default item categories are: Last Will and Testament; Living Will; Medical POA; Organ Donation; and Trust.

The Legal aggregate container is provided to store legal documents. Default item categories are: Birth Certificate; Marriage Certificate; POAs; House Deed; Vehicle Title; Divorce and Child Custody; and Secret Clearance.

The Medical aggregate container captures medical documents. Default item categories are: Dental Records; Medical Records; Emergency Contact; and Organ Donation.

The My Wallet aggregate folder is meant to be a reflection of important cards that are in the user's wallet. Default item categories are: Birth Certificate; Passport; SSN; Military ID; Driver's License; DPOR; Health Services; Bar; Student; Pictured ID; Credit Card; Debit Card; Loyalty Card; Rewards Card; and Travel Card.

The PCS aggregate container stores all documentation gathered and created during a PCS move. Default item categories are: BAH and DLA; DPS and Travel; Family Support; House Management; Medical Records; Occupation; PCS Checklist; School Information; and Tax.

The Vehicle aggregate folder is provided to store vehicle title, insurance, and registration documentation. Default item categories are: Driver's License; Vehicle Registration; Vehicle Insurance; Vehicle Title; Vehicle Inspection; and Vehicle Emissions.

The Personal Contents container provides the capability for a user to inventory the entire contents of their home and store the information, photos and a replacement cost online. In the event that a disaster occurs, the user will be able to print a complete list of all items, complete with serial numbers and replacement cost for the insurance company. Policies, riders, notes, and any other attachments will be included in this collection for digital "in hand" documentation right from the pane. The attachments can be printed by opening up the documents from that attachment tab and printing them for a complete claims packet. If the OEM desires, the claims paperwork can be included, which would be prepopulated, and what is not available, the user could type into the fillable form and even digitally sign with pre-signing authentication privileges.

The password vault provides a convenient way to remember passwords. The password vault securely stores and manages username and password information, along with the optional associated Website URL. Password and Usernames filled into property tabs will be mirrored in the password manager for ease of use.

The photo album provides users with the ability to securely store and manage photos and photo albums. Moving your mouse over a picture will pop up a description of the picture that the user has entered. Photos can be shared and multiple albums can be created.

The contact manager provides the user with the ability to securely store and manage personal and business contacts. The manager provides the ability to have and share many different address books containing important contacts. Easily add, update or delete contacts to an address book. Contacts can easily be searched using a free text search that supports wildcards. The contact manager will have the ability to add birthdates, anniversaries, and special days to celebrate fields. Our REMINDME will send the user an IM, Text, or Email providing the person, the event, and the number of years (how old someone is or what year of anniversary they are celebrating). Contact information from the property tabs will be mirrored into the contact manager for ease of use. A flagged entered into the event field will add the event into holiday section of the calendar along with Nationally Celebrated Holidays.

Mirroring is the capability to assign an Item Category to appear in multiple Aggregate Containers at the same time. For example, the "Driver's License" category exists in both the Identification and My Wallet containers and the "Vehicle Title" category exists in both Vehicle and Legal containers. This capability is similar to a Shortcut (in Windows), an Alias (in MacOS) or a Link (in Linux/Unix), but differs in fact that the references in all of the Aggregate Containers are logical references; there is no physical reference. When deleting a mirrored Category Item in an Aggregate Container, it will only delete the logical reference, unless the Category Items is the last reference, in which case the logical reference and the physical document reference are both deleted.

With mirrored Category Items, any changes in one container also updates in all other containers that shared the category. For example, adding a new note to one Item Category is also added to all other mirrored copies. Property tab fields for the password manager and contact collection will be mirrored as well.

Categories are a classification or grouping to manage related documents. Each category can contain many different documents. For example, in the Credit Card Category a user may have several VISAs, Mastercards and American Express credit cards. What system Categories are available depends on which Container is selected. It does not make sense to have some Categories available in some Containers. For example, it does not make sense for the Password Category to be available in the Medical Container. There are hundreds of system defined Categories.

Examples of System Categories: 529 Plan, Insurance Card, Prescription Drug Card, Auto Insurance Card, Investment, Retirement, Bank Card, Last Will and Testament, Rewards, Birth Certificate, Living Will, School Information, Company ID, Loyalty, SSN Card, Credit Card, Marriage Certificate, Student ID, Death Certificate, Medical Insurance, Travel, Deeds, Medical Records, Trust, Dental, Membership, Vacation, Driver's License, Military ID, Vehicle Insurance Policy, Home Deeds, Passport, Vehicle Registration, Home Insurance, Pet Care, and Vehicle Titles.

Based on the Wizard setup choices, property templates will be prepopulated for the user for ease of use. Item Types are searchable metadata, attachments, notes and keywords that are associated with a given document. For example, if a user is adding a Texas Driver's License s/he will choose the "US Texas Driver's License" Item Type from the "Driver's License" Category. The "Properties" tab for each Item Type contains user fillable (and searchable) data fields in a template that is specific to a given document:

There are thousands of pre-defined system Item Type properties templates. For instance in the United States there is a separate driver's license property templates for each individual US State (including Washington, D.C. and the territories). There are also driver's licenses templates for Canada, Mexico, UK and Germany.

The Item Type Property Template fields support collecting several different data types:

Alphanumeric Text; Number (Integer or Decimal/Float); Date; Time; Currency; and List of Values (Dropdown List).

The data type assigned to a property will affect the data validation and formatting. For instance, if the field is Integer Number type the user interface will not permit a user to enter an alphabetic character into the field. A field that is a currency data type will be displayed in a format consistent with the localization settings specified in the User's Profiles settings and may be displayed as "$1,467.15" (US), "£1,467.15" (UK), "1 467,15 €" (France), or "1.467,15 €" (Germany).

Click on the General Cancellation Report button will generate a report listing all cards and documents stored in the given aggregation. The report contains a description of the card or document, the ID number (if applicable), the Item Type, the card/document issuing organization, complete with the organization's phone number and Website. The cancellation report is especially useful in the case of the "My Wallet" aggregation when the user has lost or had stolen their wallet and need to quickly cancel all cards. The report provides a list of every card in the wallet and the phone number to call to cancel the cards. All information associated with a card or document stored in STORESECURE can be printed out from the Item Details pane. The print out contains the Item Type, a small image of the scan (if available), all of the fields found in the "Properties" tab, a list of the names and dates of the attachments, all notes and all of the fields found in the "Renewal/Review Task" tab (if applicable).

Each collection has a different printing capability and some collections do not support print at all.

The Personal Contents Collection stores the entire contents of the user's home. In the event that a disaster occurs, the user can click on the "General Report" button to generate an insurance claim report, that list the user's complete home contents, complete with serial numbers, replacements cost and photos.

The Password Vault Collection does not provide any printing capabilities.

The Photo Album Collection prints out thumbnail images of all photos in a given photo album.

The Contact Manager Collection provides basic print out capabilities. Users can print out all contacts for a given address book or print all contact from all address books. There are two supported print layouts: tabular list and business card format.

The user has the ability to share all documents stored in STORESECURE with their family, friends, coworkers, power of attorney and acquaintances who are users of the system. The product provides a fine level of control of who has access to which documents or collections. Configuring of sharing is done in the Sharing section of the Profile page. Sharing can be quickly and easily setup for family members and power of attorney. In addition, detailed Access Control Lists (ACLs) can be configured in the User.

LIFEPROCESSOR is a comprehensive task management application. It allows users to create, organize, and perform a variety of tasks, including document renewal and review, recurring, checklist, and user created tasks. Basic operations like creating, deleting, and completing tasks can be easily accomplished. When a task cannot be completed as originally scheduled, the user can postpone it or reassign it to an affiliated user. The default LIFEPROCESSOR view is Daily Tasks which provides an overview of the current and over-due tasks on a day-by-day basis. The Recurring Tasks view allows the user to create and manage tasks that recur (e.g. pay credit card bill). The Checklist Tasks view allows the user to create and manage checklists, which are comprised of ordered tasks. Tasks created in the Recurring and Checklist Tasks views are also visible in the Daily Tasks view, so the user always knows the tasks that are scheduled for any given date. The Daily Tasks view gives users a day-by-day view of the tasks they must accomplish. The LIFEPROCESSOR screen is split vertically into three window panes.

The left pane is the Daily Calendar which shows the events and appointments for the user and affiliated members. This allows the user to organize their day to quickly determine whether they can complete a given day's tasks. At the top of the pane, the "Today" button returns the Calendar view to the current date when pressed. Immediately below this button, a date field, back, and forward arrows allow the user to navigate quickly to other dates. Below these items, the Calendar view displays the user's and affiliated members' appointments for the selected date. Appointments are color coded so that the user can quickly determine their source calendar. Below the Calendar view is a color coded list of the user's and affiliated members' calendars. To limit the events displayed in the Calendar view, the user can uncheck the calendars they wish to hide. The user can enter Nationally Celebrated Holidays and Calendar Dates with our very limited functionality of COMPROCAL that comes bundled with our UNIVERSALWORKSPACE. The user will be able to view all shared member's calendar entries. Special events, birthdays and anniversaries will be displayed alongside the Holidays if flagged in the contact collection container.

The middle pane is the Daily Tasks which shows the current and over-due tasks for the date selected at the top of the pane. Like the Daily Calendar pane, the "Today" button, date field, and arrow buttons can be used to change the date displayed. By default, the date displayed for Daily Calendar and Daily Tasks are synchronized. By toggling the "Sync Calendar" switch to "Off", the user can select different dates on each of the two panes. Immediately below these items, the "New Task" field allows the user to quickly create a new task for the given date. The user must enter a task name, but all other task properties are defaulted to reasonable values. The task table lists the selected date's task. Current tasks are in plain text. Over-due tasks are in red. Completed tasks are in strikethrough. By default, tasks are listed by descending Priority (first column), but the user can reorder tasks by clicking on the column headers. Clicking on cells in the Priority and Task columns allows the user to quickly change the selected tasks priority and name. Tasks are prioritized by A, B, C, D and E. The trash can icon found in the third column of each row allows the user to delete tasks. The menu drop-down next to it permit the following actions: Complete—complete the current task; Re-assign—reassign the current task to an affiliated member, the member can accept or reject it; Postpone—change the current task's completion date to a later date; and Re-instate—make active a complete task. When a user completes an item from STORESECURE that was a renew or review task, the system will ask the user for the latest picture of the item and if the attachments should appear in the current property details. Once the user confirms the pre-populated fields are correct and decides to copy current attachments in new metadata, the item will be updated and a history tab will appear in the item's property details pane with the previous property tab data, old attachments and notes. In the event the user ever wants to reinstate the task, all the attachments, notes, and etc. will repopulate the task. Clicking on one of the rows in the task table selects that task and displays the details in the Task Information pane.

The right pane is the Task Information which lists all of the properties of the selected task. This pane has three tabs: Task Details, Attachments and Notes. The Task Details tab contains a vertical list of all task properties. All tasks have the following common properties: Task Title; Priority; Start On and Complete On dates; Enable Reminder and Reminder Type; Contact Name and Phone; Action URL; and Description. In addition to these common properties, some tasks have custom properties associated with them. Typically, these tasks require the user to gather information that is the used to populate forms, update a STORESECURE item, etc. The Attachments tab contains all of the attachments associated with the selected task. The tab title will display the number of attachments when there is at least one associated file. When a review/renew task is created from STORESECURE, all of the associated item's attachments will be copied into the new task. The user can add one or more attachments to the task by using the bulk upload dialog launched by clicking the "Add Attachment" button. Clicking on an image's filename in the attachment table displays a large sized image in a light box widget. The icons in the third column of each row allow the user to download a copy or delete the selected attachment. The Notes tab displays all notes associated with the Task. Like Attachments, the tab title displays the total number of notes. Users can add a new note by entering text in the "New Note" text area and then clicking the "Add Note" button.

The Recurring Tasks view allows users to manage recurring tasks. It is also organized into three panes. The left pane is the Recurring Tasks which lists all of the Recurring Task series that have been defined. The user can create a new Recurring Task series by entering a name in the New Task field. The table lists all series which have been created, and allows the user to delete existing series by clicking on the trash icon. Clicking on a row in this table selects that Recurring Task series. The middle pane is the Recurring Task Information which displays detail about the selected Recurring Task series. It is divided into three tabs: Task Details, Series Attachments and Series Notes. The Task Details tab contains a vertical list of all Recurring Task series properties. All series have the following common properties: Task Title; Priority; Frequency; Frequency Interval; Frequency specific properties; Time of Day; Start Date and End Date; Enable Reminder and Reminder Type; Contact Name and Phone; Action URL; and Description. When the user creates a new series or updates an existing series, tasks are created that match the frequency values set in these properties (i.e. if a user specifies that they must pay their credit card bill on the last day of every month, the system creates a set of tasks for the last date of every month and the user will see these tasks appear in their Daily Tasks view on those dates). The Series Attachments Tab contains all of the attachments the user has associated with the selected Recurring Task series. This works exactly like the Attachments tab in the Task Information pane in the Daily Tasks view. The Series Notes Tab contains all of the notes the user has associated with the selected Recurring Task series. This works exactly like the Notes tab in the Task Information pane in the Daily Tasks view. The right pane is the Task Occurrences which displays a list of all of the individual tasks associated with a Recurring Task series. The "Show Overdue Occurrences of this Task" radio button allows the user to choose whether overdue tasks in this series should be displayed. This allows the user to distinguish tasks that must be accomplished even if they are overdue (i.e. pay credit card bill) from tasks that cannot be completed once they are overdue (i.e. take trash out). The table lists the tasks in the series. Tasks can be completed, reassigned, and postponed directly from the menu dropdown in the third column.

The Checklist Tasks view allows users to create and manage checklists and their associated tasks. The view is divided into three panes. The left pane is the Checklists which are show all available checklists. Users can create a new checklist by entering a name in the New Checklist field. When the "Add Checklist Template" button is clicked, the user is presented with a list of predefined Template Categories (e.g. PCS Plan My Move). After selecting a category, the list of Checklist Templates that are associated with that category are displayed. The user must select the Checklists they wish to create, Start On and End On dates, and the click the OK button. This creates all of the selected Checklists, including any associated tasks, attachments, and notes. Task order, start and end dates, and associated information for checklists created using the Checklist Template wizard will reflect the recommendations and best practices captured during the creation of the Template, but will be constrained by the Start On and End On dates specified by the user. Selecting a checklist in the Checklist table populates the Checklist Information pane.

The middle pane is the Checklist Information which displays properties of the checklist as a whole. It is divided into four tabs. The Checklist Details tab contains a vertical list of all Checklist properties. All checklists have the following common properties: Checklist Title; Start On and Complete On dates; Enable Reminder and Reminder Type; Contact Name and Phone; Action URL; and Description. The Checklist Tasks tab displays an ordered list of all of the tasks associated with a checklist. New tasks can be added to the checklist using the New Task field. Tasks can be rearranged, completed, reassigned, and postponed using the controls on the checklist table. Required Tasks are displayed in bold with an asterisk prefix and cannot be deleted. Selecting a task in the Checklist Tasks table populates the Task Information pane. The Attachments Tab contains all of the attachments the user has associated with the selected Checklist. This functions exactly like the Attachments tab in the Task Information pane in the Daily Tasks view. The Notes Tab contains all of the notes the user has associated with the selected Checklist. It functions exactly like the Notes tab in the Task Information pane in the Daily Tasks view.

The right pane is the Task Information which functions very similarly to the Task Information pane in the Daily Tasks view. Task Details shows the same common properties, and displays custom properties on those tasks used to gather data for form population and STORESECURE Item properties. Attachments and Notes behave the same as in the Daily Tasks view. The biggest difference is the Related Items tab. The Related Items tab allows users to associate tasks with items from STORESECURE. This is useful for tasks which relate to the types of documents and information captured in STORESECURE. For example, a task that requires the user ensure his family's passports are in order might have links to the Passport item in each of their Identification containers. Tasks created using the Checklist Template wizard can contain links to placeholders for items that are not yet in the user's STORESECURE. By clicking on these links, the user will be prompted to upload an image of each item and provide basic information about them (e.g., a placeholder link to a driver's license would ask for the user's license number and expiration date).

All information associated with a daily task detail that is stored in LIFEPROCESSOR can be printed out from the Task Information pane. The print out contains the task title, all of the fields found in the "Task Detail" tab, a list of names and dates of the attachments and all notes. All information found in the middle Recurring Task Information pane can be printed out. The format with the detail, attachments and notes is same as the Daily Tasks. With Checklist Tasks, both the information on Checklist Information pane and the Task Information pane can be printed. The checklist details, the list of checklist tasks, the associated attachments and the notes can be printed out from the Checklist Information. The print out contains the checklist title, all of the fields found in the "Checklist Details" tab, a tabular checklist of tasks found in the "Checklist Tasks" tab, a list of names and dates of the attachments and all notes. The task details, a list of related items, the associated attachments and the notes can be printed out from the Task Information. The print out contains the task title, all of the fields found in the "Task Details" tab, a simple list listing item names of related items, a list of names and dates of the attachments and all notes.

Military Permanent Change of Station (PCS) checklist/wizard is a custom module that was created using LIFEPROCESSOR checklists. The move checklists are created using the "Add Checklist Template" dialog. By selecting a type of move in the Template Category dropdown, the user will be presented with a set of checklist templates associated with that move. Once the user selects one or more of those templates and provides the start and end dates for the move, fully populated checklists will be created with all recommended tasks, associated documents, and forms.

Several predefined Permanent Change of Station (PCS) move checklists available in the LIFEPROCESSOR product: Family and Coping; Identification; Legacy and Legal Checklist; Medical Checklist; School Enrollment; Spouse Work Support; BAH and DLA; Finance and Insurance; DPS and Travel; Carry On Base; Tax Checklist. For example, when a DPS and Travel check list is created the following things should be noted:

(1) While it is recommended that the user begin this checklist 90 days prior to their move, the system will accommodate shorter timespans. The user is warned if they enter a shorter timespan as they might have more than the suggested 2 to 3 tasks to complete per day.

(2) Army PCS Handbook and DFAS Wizard Step by Step are prepopulated as Checklist Attachments in the middle pane to assist the user with the DPS and Travel section of the move. (Checklist Attachments are included in the middle pane for review of each section of a PCS Move.)

(3) The required tasks that will assist with advance pay or filling out forms will be bolded.

(4) The suggested tasks are not highlighted and can be deleted if the user does not want to perform those tasks.

(5) As the user steps through the tasks, the property tabs will have prepopulated data from the OEM files as well as the wizard profile entries. Some field data, will not be available and the user will have to fill in those items. If the property data relates to a form, the blocks within that metadata will prepopulate the form. (Instructions on the form will appear in a pop up screen as the user places the mouse over the drop down widget.)

(6) Using information gathered from completed task properties (for example, from the Itinerary task) as well as information about the user and his family captured from their profiles, DD Form 1351-2 is populated.

(7) DFAS Form 9098 and DFAS Form 9114 are also populated as blocks in these forms immolate the metadata in blocks of Form 1352-2.

The required form templates are automatically added to STORESECURE under the PCS Container. The fully populated form from the easy task process can be emailed or printed. The user can open and fill the forms, then upload and update the forms stored in STORESECURE in the PCS Container. Separation from Military, Deployment, PCS back to Stateside, and Civilian Moves will be organized with the same process. Required tasks and optional tasks formulated in a time line with forms that can be fillable. The tasks can be reassigned to share profile users to be worked. The share member has to accept the reassigned tasks. The completed task(s) appears in the originator's items.

Although all SmartVault products support electronic form files as documents in STORESECURE or as attachments, the only electronic forms that read and interact with the forms by the system are the forms required to support the Permanent Change of Station (PCS) move. Two form types are currently supported: Adobe Portable Document Format (PDF) fillable forms and IBM Forms. In order to view and fill a PDF form, the Adobe Reader (previously Acrobat Reader) must be installed. In order to view and fill an IBM form, the IBM Form Viewer must be installed.

The system supports pre-population and post processing capabilities with the PCS move forms. The system provides basic pre-population capability to PCS Move forms and can fill in basic information for the Soldier such as their basic personal information (e.g. First name, middle name, last name, birthdate, military service, etc.) from the user's profile. When the PCS checklist process is initiated the required PCS forms are pre-populated and are saved to the PCS Container in STORESECURE. In addition to pre-populating the forms the associated Item Details properties are also automatically filled.

The system provides basic post processing of the PCS Move forms. When a user uploads and updates a form in STORESECURE, the system automatically detects that the uploaded object is a PCS Move form and will retrieve form data from the form and populate the correct corresponding Item Details properties associated with the form file in STORESECURE.

REMINDME is a stand-alone scheduled service that handles the asynchronous notification for all SmartVault products. It is used for sending reminders to users of upcoming or overdue tasks and calendar events. REMINDME supports sending notifications via SMTP e-mail, SMS text messaging, instance messaging and SmartVault popup messages (if user is logged into the SmartVault portal using a web browser). The service does not directly interact with mobile device notifications, but the SmartVault mobile application can configure native calendar reminders on mobile devices using the same data as REMINDME uses. The REMINDME service does not have its own user interface and instead utilizes the user interface in the other products.

The contact manager will have the ability to add birthdates, anniversaries, and special days to celebrate fields. Our REMINDME will send the user an IM, Text, or Email providing the person, the event, and the number of years (how old someone is or what year of anniversary they are celebrating). Contact information from the property tabs will be mirrored into the contact manager. An example of an email notification from the SmartVault REMINDME system will appear as follows.

The REMINDME service supports sending notifications via SMTP e-mail, SMS text messaging and instance messaging (XMPP and SIP). The frequency of REMINDME notifications is configurable. Tasks support reminders being sent 15 minutes up to 1 month before a tasks expires. Calendar events (such as birthdays, holidays, etc.) are typically sent no more than once a day, due to delays of the underlying messaging systems. Daily notifications are typically sent at the same time of day for each given time zone.

The user can specify an e-mail address and a mobile number to be used for notification in the user profile settings. The registration an e-mail address and phone number uses a 2 step process which verifies that the user has the correct address by sending a message to the address that the user has to respond to.

The SmartVault solution is an extremely secure cloud-hosted suite of integrated Web applications exposed as a Software as a Service (SaaS). Users access the SmartVault Web application using a standard Web browser on a personal computer or mobile device. The user connects to the application through a firewall and a reverse proxy to a load balanced SmartVault application cluster. A secure connection between the Web browser and the SmartVault Web application is established using 2048-bit keys and 256-bit EV SSL encryption. Once a secure encrypted connection is established, the users signs on to the application using their Single Sign-On (SSO) credentials. Typically with Single Sign-On a LDAP server is utilized to authenticate the user.

The SmartVault solution uses an innovative risk-based authentication, which determines the type of authentication based on the type and sensitivity of the data that the user stores in their workspace. As the user adds more sensitive Personally Identifiable Information (PII), the system reassesses the overall personal risk rating and automatically increases the complexity of authentication required to authenticate the user, assuring the level of security is sufficient to the current level of risk.

All sensitive information that is stored in database fields and all documents that are uploaded and stored in STORESECURE are encrypted with AES 256-bit military grade encryption. Connections to the database from the application are made with a low privilege service account. The database is clustered for redundancy and scalability. Documents stored in the content repository are encrypted and stored in standard files on a standard file system on a cloud storage device or a highly redundant storage area network (SAN). Data stored on a cloud storage device is replicated across multiple data centers to ensure data integrity. SAN data can be replicated easily and should one application server fail, the data will still be available to users. The solution has been designed from ground up to be highly scalable, available and secure. The firewall/reverse proxy prevents unauthorized access or probing into the cloud. Both the HTTP servers and the Web application server are clustered and are load balanced. This allows the solution to be horizontally scalable (by adding additional server nodes) and vertically scalable (by adding multiple server instances on a single server), in order to easily support a growing amount of users.

The SmartVault supports both a commercial and open-source infrastructure: Commercial; Open-Source; Operating System: RedHat Enterprise Linux; Ubuntu Linux; Web Server; IBM HTTP Server; Apache HTTP; Web Application Server; WebSphere Application Server; Tomcat Application Server; Database; DB2 or Oracle; and PostgreSQL. The solution typically utilizes existing member LDAP directory server and SMTP e-mail server, but can be configured to have these services local. The solution requires an external SMS service to deliver SMS notification messages.

All SmartVault application are developed using Java 7 and J2EE 6 (Servlet 3.0, JSP 2.2). The applications completely separate the user interface and the data access. The user interface relies on real-time REST data services via AJAX to populate the data. The server uses Jersey/JAXRS and JSON technology to manage and format the data. The user interface has been developed using standard HTML 5 and CSS3 technologies.

The Single Sign-On authentication uses a Light-Weight Directory Protocal (LDAP) server to manage and authenticate users. If multiple LDAP repositories are required the solution can be configured to use federated repositories.

The SmartVault solution utilizes clustered database servers to provide high-availability data access. This is critical as the products heavily rely on the database server cluster to persist all application data, with the exception of file content which is stored in the content repository. The database is also used extensively for searching and for generating some print outs and reports. A separate database that is updated nightly is used as a data warehouse and is used for offline reports and analytics.

All documents that are uploaded into SECURESTORE are encrypted with military grade encryption and are stored in a simple content management system called Simple File Archive (SFA) on a cloud storage device or a redundant Storage Area Network (SAN). Upon storing the document, the SFA returns the unique ID assigned to the file object. The document's object ID and associated document metadata are then stored in an enterprise database. The document and database storage are treated as a single indivisible transaction.

The SFA content management provides extremely fast millisecond access to store or retrieve document objects even with very large repositories with billions and billions of small to medium sized files. Since the SFA was specifically designed for the simple retrieval and storage of large numbers of files, file access is many time faster than most content management systems.

The SmartVault products support sending notifications via SMTP e-mail, SMS text messaging and instance messaging (XMPP and SIP). The SMTP can either be configured to use an existing member mail server or can utilize a local SMTP mail server in the cloud. The SMS text messaging is provided by interfacing with a third party SMS provider. The instance message routing is handled directly by the local scheduled REMINDME service.

Analytics and reporting are a key part of the SmartVault solution. SmartVault Analytics is a suite of data analysis and information presentation tools, including reporting, "dashboards", and on-line drill down from high-level summary to low-level details of your data. The Report Server: Accepts and executes query specifications from reporting applications; Renders the SmartVault Connection user interface; and Each report server can operate several services including the report service and presentation service.

A Report Server installation includes the following components: Bootstrap service; Presentation service; Report service; Job and schedule monitoring service; Batch report service; and Log server. Each report computer has a bootstrap service that starts, monitors and stops the dispatcher. If the dispatcher fails, the bootstrap service restart it.

The presentation service is used for SmartVault Connection and a small number of Query Studio dialogs. The presentation service: Accepts user requests primarily through SmartVault Connection; and Creates SmartVault Connection pages. The presentation service spans one thread per user request, the application server manages the threads. Threads are reused to conserve resources.

Report services provide: Metadata access; Data access (query); Prompting; and Report execution including rendering. Report services execute reports. The provide metadata to Report Studio, Query Studio and any third party application integrated with Report Server. The report service runs all interactive reports. The batch report service runs scheduled reports as initiated by a job.

Part of the high availability strategy is to ensure that the data is highly redundancy. There are two main sources of data: the database and the content repository. The clustered databases work together to replicate data and ensure that if one database fails other database servers take over. In addition, the database have been configured to continuously save archive logs to the cloud storage device or Storage Area Network (SAN) and make regular hot backups with a checkpoint.

The content repository is stored on either a cloud storage device or SAN to ensure data integrity. Cloud storage devices replicate across multiple data centers in order to provide extremely high durability. In fact the SmartVault file storage is designed to achieve 99.999999999% data durability.

SmartVault places the highest value on protecting the privacy, confidentiality, and security of member information. This is accomplished using a layered security strategy which combines strict security procedures with industry "best practice" network, application, database and system security to achieve a comprehensive solution, where the whole is greater than the sum of its parts.

The secure storage and management of member's critical life documentation such as personal, legal, legacy, medical, education and financial information, is of upmost importance. All stored documents and sensitive data are encrypted using FIPS certified military grade AES 256 bit encryption, the same encryption used by the US government for encryption of top secret information. Communication between client browser and the application is secured using 2048-bit keys and 256-bit EV SSL encryption.

The solution attempts to find the perfect balance of performance, convenience and security. If the system is too slow, users will not use the system. Too much security, users will either not use the system, or will find creative ways to defeat the controls, such as recording passwords on Post-It Notes stuck to their computer monitor. Too little security creates too much risk, increases the possibility of compromise and loss of trust.

Users can choose between "Managed Key" or "Personal Key" key management strategies to tailor security to their individual needs. The default option is system managed keys, which uses the server's encryption key and the username of the user to decrypt the user's encryption key, which in turn is used to encrypt and decrypt files and sensitive data. This approach provides an excellent balance of security and convenience, and provides a number of features such as the ability to share documents with other family members, and the ability to reset a user's password without losing access to their encrypted files. The personal key approach uses the user's logon password, which is only known to the user, to decrypt the user's encryption key. Personal key encryption offers unsurpassed security, but at the cost of losing some features, such as the ability to share files and reset passwords. If a user forgets their password using this approach, then all encrypted documents stored in SmartVault would be lost as they cannot be decrypted by either the user or by SmartVault employees.

The application uses an innovative risk based security where the member starts out with basic authentication. As the individual adds sensitive or Personally Identifiable Information (PII) to the application, the system reassesses and automatically increases the security sufficient to the level of risk. As the security level increases, the more complex the authentication required to authenticate the user. The system has been designed to have extensive security, application logging and audit triggers to ensure that in the event of an incident, every aspect of the session can be recreated, similar to a black box recorder in an aircraft. The SmartVault cloud data center employs state-of-the-art security with 24×7×365 monitoring and security, fire detection and suppression systems, redundant power, and employs the highest security standards. For more information regarding security, please consult the Security Section later herein.

The SmartVault mobile application provides ability to directly access the SmartVault portal and can be used from all of the most popular mobile devices. Taking photos of inventory on your mobile device and uploading into directly into the STORESECURE Personal Contents Collection is fast and easy. Use template forms and the device's built in camera to photograph identification or documentation and automatically upload the digital photo and associated metadata into STORESECURE. Get important task and document expiry notification directly on your mobile device. Mobile Application Features: Log into your SmartVault workspace quickly and securely directly from your mobile device; Upload photos of identification, document scans and inventory into STORESECURE and LIFEPROCESSOR; Quick access to view documents and tasks in STORESECURE and LIFEPROCESSOR; Receive native document and task expiry notification directly on the phone in addition to the standard SMS notification; and Tasks calendar events can be downloaded into native phone calendars.

The SmartVault mobile application has a very consistent user interface across all major mobile platforms. A user who is familiar with the Apple iPhone SmartVault mobile application will be able to immediately use the SmartVault mobile application on Samsung Android mobile device. The SmartVault mobile application uses a mix of Adobe PhoneGap/Apache Cordova technology and native user interface widgets to ensure consistent mobile interfaces across multiple mobile platforms. The SmartVault mobile application has a few capabilities that are not available with the PC browser-based application: Uses built-in camera to capture documents and photos and upload them to the portal; and The mobile application registers notifications with the native calendar to provide native mobile notification messages to remind the user about task and calendar events.

The SmartVault mobile application supports Android, BlackBerry, Apple iOS, Windows Phone, Tizen, WebOS, Symbian and Bada mobile devices. The SmartVault mobile application is developed using the Adobe PhoneGap/Apache Cordova mobile development framework. Hybrid of platform specific native UI capabilities combined with JavaScript, HTML5 and CSS3. The SmartVault file upload and storage synchronization service provides a convenient way to upload files from your PC directly into the user's STORESECURE containers. The SmartVault containers can be accessed via the SmartVault upload/synchronization icon in System Tray.

What sets Active Recommend Analytics apart for the OEM Customer? It enables and optimizes member cross brand education! The recommend technology is a catalyst for delivering notifications or alerts to both the member and the OEM SME Brand Provider for better decision-making and actionable results to best serve the customer's needs. It launches operational processes (in the form of task driven lists) based on rules invoked from an active analysis of the most current users data set. As the user makes life decisions, the recommend technology can educate the user to better product choices and request a reach-out to the OEM specialist for more details. Our 'On the Move' prepopulated checklists will recommend the Auto Event with the MALT POV calculator in the PCS move. The Real Estate Event will be searched based on BAH calculations, spousal wages, and how long the PCS is expected. Our system will also push the user to speak with specialists for savings and investment reviews, children college plan advice, and the complete insurance suite from home, rental, life, health, etc. As the uniform personnel moves from one location to another, our checklists will describe SCRA and provide a calculator to see if the soldier qualifies. This is a terrific way to reduce mortgage, personal loans, credit card and car loan interest rates. Based on simple calculations, our system will direct the military personnel user to contact our OEM specialist for great reductions in monthly outlays. Once the new user is a seasoned user, The OEM's SmartVault is ACTIVELY maintained with redundant documents and instant retrieval as renewals and reviews cycle through life to optimize smart brand choices in appropriate life-lines for a user's career, separation, and retirement from military and work life. Our system promotes retention, creating an environment to sell a cross brands for the life span of a client.

The SmartVault solution also provides extensive business analytics and reporting to each OEM Brand Manager. This is handled by a link to a Standard Reporting page to allow the user to choose what reports they would like to run. There will be 25 Standard Reports available to the EOM Brand Managers. Although standard reports are predefined reports, you can define pre-filters before generating a standard report to have the report output display information only about specific types of cases. Pre-filters let you narrow down the case series further so that the system runs the report only on those cases that conform to the pre-filter criteria. The STANDARD REPORTS page displays the following information for each report: Name of the report; Brief description of the report; Date when the report was last modified; Author of the report. For standard reports, the author is InteractVault; Category to which the report belongs. For example, Compliance, Management, Call Center etc.

In addition, the STANDARD REPORTS page provides several standard tools to help you find a specific report or group of reports. You can: Scroll up and down to browse through the list; Click a column heading to sort the list; and Enter keywords in one or more column fields and then click Search to find reports that satisfy your specified criteria.

As an optional service, SmartVault members are able to enroll in the SmartVault Cancellation Service to protect credit cards, debit cards, gas cards and similar payment cards the user has in their STORESECURE wallet. If a member's wallet is lost or stolen, the SmartVault call center would immediately notify the card companies on the member's behalf. Once the companies had been notified, the member is no longer liable for unauthorized purchases.

Additional Details Regarding Security

InteracVault places the highest value on protecting the privacy, confidentiality, and security of member information. This is accomplished using a layered security strategy which combines strict security procedures with industry "best practice" network, application, database and system security to achieve a comprehensive solution, where the whole is greater than the sum of its parts.

The secure storage and management of member's critical life documentation such as personal, legal, legacy, medical, education and financial information, is of upmost importance. All stored documents and sensitive data are encrypted using FIPS certified military grade AES 256 bit encryption, the same encryption used by the US government for encryption of top secret information. Communication between client browser and the application is secured using 2048-bit keys and 256-bit EV SSL encryption.

The solution attempts to find the perfect balance of performance, convenience and security. If the system is too slow, users will not use the system. Too much security, users will either not use the system, or will find creative ways to defeat the controls, such as recording passwords on Post-It Notes stuck to their computer monitor. Too little security creates too much risk, increases the possibility of compromise and loss of trust.

Users can choose between "Managed Key" or "Personal Key" key management strategies to tailor security to their individual needs. The default option is system managed keys, which uses the server's encryption key and the username of the user to decrypt the user's encryption key, which in turn is used to encrypt and decrypt files and sensitive data. This approach provides an excellent balance of security and convenience, and provides a number of features such as the ability to share documents with other family members, and the ability to reset a user's password without losing access to their encrypted files. The personal key approach uses the user's logon password, which is only known to the user, to decrypt the user's encryption key. Personal key encryption offers unsurpassed security, but at the cost of losing some features, such as the ability to share files and reset passwords. If a user forgets their password using this approach, then all encrypted documents stored in InteracVault would be lost as they cannot be decrypted by either the user or by InteracVault employees.

The application uses an innovative risk based security where the member starts out with basic authentication. As the individual adds sensitive or Personally Identifiable Information (PII) to the application, the system reassesses and automatically increases the security sufficient to the level of risk. As the security level increases, the more complex the authentication required to authenticate the user. The system has been designed to have extensive security, application logging and audit triggers to ensure that in the event of an incident, every aspect of the session can be recreated, similar to a black box recorder in an aircraft. The InteracVault cloud data center employs state-of-the-art security with 24×7×365 monitoring and security, fire detection and suppression systems, redundant power, and employs the highest security standards. All InteracVault products where designed from ground up with security in mind. Wherever possible the products implement top industry standards and best practices with regard to security and auditability.

The InteracVault products take into account recommendations from the following standards: SP 800-122—NIST Guide to Protecting the Confidentiality of Personally Identifiable Information; FIPS PUB 140-2—Federal Information Processing Standards Publication Security Requirements For Cryptographic Modules; FIPS PUB 197—Advanced Encryption Standard (AES); FIPS PUB 199—Federal Information Processing Standards Publication Standards for Security Categorization of Federal Information and Information Systems; ISO/IEC 27001—Information Security Management System (ISMS) Standard; PCI DSS—Payment Card Industry Data Security Standard: Protection of Cardholder Data (CHD); GLBA—Gramm-Leach-Bliley Act: Safeguarding Non-Public Personal Information (NPI); SOX—Sarbanes-Oxley Act: IT general controls (ITGC); and HIPAA—Health Insurance Portability and Accountability Act: and Protected Health Information (PHI). The InteracVault cloud data center has in the past successfully completed certifications: SOC 1/SSAE 16/ISAE 3402/SA570 Type II; SOC 2; and ISO 27001 certified.

The InteracVault solution is an extremely secure cloud-hosted suite of integrated Web applications exposed as a Software as a Service (SaaS). Users access the InteracVault Web application using a standard Web browser on a personal computer or mobile device. The user connects to the application through a firewall and a reverse proxy to a load balanced InteracVault application cluster. A secure connection between the Web browser and the InteracVault Web application is established using 2048-bit keys and 256-bit EV SSL encryption. Once a secure encrypted connection is established, the users signs on to the application using their Single Sign-On (SSO) credentials. Typically with Single Sign-On a LDAP server is utilized to authenticate the user. The InteracVault solution uses an innovative risk-based authentication, which determines the type of authentication based on the type and sensitivity of the data that the user stores in their workspace. As the user adds more sensitive Personally Identifiable Information (PII), the system reassesses the overall personal risk rating and automatically increases the complexity of authentication required to authenticate the user, assuring the level of security is sufficient to the current level of risk.

All sensitive information that is stored in database fields and all documents that are uploaded and stored in STORESECURE are encrypted with AES 256-bit military grade encryption. Connections to the database from the application are made with a low privilege service account. The database is clustered for redundancy and scalability. Documents stored in the content repository are encrypted and stored in standard files on a standard file system on a highly redundant storage area network (SAN). SAN data can be replicated easily and should one application server fail, the data will still be available to users. The solution has been designed from ground up to be highly scalable, available and secure. Personally Identifiable Information (PII) is information that can be used, either on its own, or with other information, to uniquely identify or locate a person. All PII stored electronically must be categorize and sufficiently protected according to level of risk of exposure to the individual.

NIST SP 800-122 defines PII as "any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information." The EU directive 95/46/EC (Data Protection Directive) defines PII as "'personal data' shall mean any information relating to an identified or identifiable natural person ('data subject'); an identifiable person is one who can be identified, directly or indirectly, in particular by reference to an identification number or to one or more factors specific to his physical, physiological, mental, economic, cultural or social identity." Examples of PII include, but are not limited to: Full name (if not common); National identification number (SSN, NINO, etc.); Passport; Medical record numbers; Health insurance beneficiary numbers; Vehicle registration plate number; Vehicle Identification Number (VIN); Driver's license/ID card number; Biometric identifiers (e.g. face, retina, fingerprints, voiceprints, handwriting, etc.); Credit or debit card numbers; Account numbers; Financial transactions; Date of birth; Birthplace; Genetic information (e.g. height, weight, hair, eye color, birthmarks, moles, scars, X-Rays, dental records, tattoos, etc.); Mother's maiden name; Certificate/license numbers; Patient ID number; Any other unique identifying number, characteristic, or code except the unique code assigned by the investigator to code the data; and Digital identity (e.g. username, handles, password, digital signature/private key, etc.). Sensitive data that may be considered PII: Grades; Salary; Job position; Age; Gender; Race; Immigration status; School or workplace; Internet Protocol (IP) address numbers (in some cases); Phone/fax/mobile numbers; Street address; Zip/postal codes; E-mail address (if private from an association/club membership, etc.); Web Uniform Resource Locators (URLs); Criminal record; and Medical dates related to an individual.

All data added to InteracVault products is classified based on its level of sensitivity, value and criticality to an individual. The classification of each data element determines how it is managed and whether the data needs to be encrypted. The overall document classification is assigned the highest rating (i.e. high water mark) of all of the metadata fields associated with the document stored. The classification rating of each document stored in the system is used to determine the overall personal risk rating, which in turn affects the level of authentication required to for an individual to log into the system. Unfortunately there is no perfect system for calculating the security categorization of document data elements. Both the NIST Federal Information Processing Standards ("FIPS") publication 199 and Special Publication 800-122 where consulted in the creation of the InteracVault information classification standard.

All information stored in the system varies in sensitivity, value and criticality to an individual. Each piece of information needs to be evaluated to determine its confidentiality impact level so that appropriate safeguards can be applied to the information. The confidentiality impact level indicates the potential harm that could result to the individual if the information was inappropriately accessed, used or disclosed. Each piece of information is ranked on the following: (1) Identifiability: How easily Personally Identifiable Information (PII) can be used to identify the individual. For example, a SSN uniquely and directly identifies an individual, whereas a telephone area code identifies a set of people; and (2) Data Field Sensitivity: The sensitivity of each individual data field. For example, an individual's SSN or financial account number is considered more sensitive than an individual's phone number or ZIP code.

Each property in the STORESECURE Property Tab has a corresponding database field in the database. These database fields are given a security classification value of a number between 0 and 25. The higher the security classification value the more sensitive the data. All highly sensitive data is encrypted in the database and all uploaded documents are encrypted. There are four types of security classifications supported by the InteracVault products: 25=Highly Sensitive/Private/Encrypted; 10=Sensitive/Private/Not Encrypted; 5=Sensitive/Public/Not Encrypted; and 0=Non-Sensitive/Public/Not Encrypted. These SmartVault Security Classification Description are as follows:

(1) Highly Sensitive/Private: Exposure could have a severe or catastrophic adverse effect to the user causing physical, social, or financial harm, resulting in potential loss of life, loss of livelihood, or inappropriate physical detention.

(2) Sensitive/Private: Exposure could have a serious adverse effect to the user causing financial loss due to identity theft or denial of benefits, public humiliation, discrimination, and the potential for blackmail.

(3) Sensitive/Public: Exposure could have a limited adverse effect to the user causing possible identity theft or loss of confidentiality that would not cause harm greater than inconvenience, such as changing a telephone number.

(4) Non Sensitive/Public: No exposure.

The following list shows several examples of Personally Identifiable Information (PII) database fields and their corresponding SmartVault security classification: Database Field: Security Classification; Age: Sensitive/Public; Bank account number: Sensitive/Private; Birthplace: Sensitive/Private; Credit card: Highly Sensitive/Private; Criminal record: Sensitive/Private; Date of birth: Sensitive/Private; Debit card: Sensitive/Private; Dental records: Sensitive/Private; Driver's license: Sensitive/Private; E-mail address: Sensitive/Public; First name: Sensitive/Public; Gender: Sensitive/Public; Health insurance card: Sensitive/Private; Height: Sensitive/Public; Identification card (D/L Equivalent): Sensitive/Private; Last name: Sensitive/Public; Mother's maiden name: Sensitive/Private; National identification number (SSN, etc.): Highly Sensitive/Private; Passport: Sensitive/Private; Password: Highly Sensitive/Private; Patient ID number: Sensitive/Private; Phone/Fax/Mobile numbers: Sensitive/Public or Sensitive/Private; Race: Sensitive/Public; Salary: Sensitive/Private; Street address: Sensitive/Public or Sensitive/Private; Student grades: Sensitive/Private; Username: Sensitive/Private; Vehicle Identification Number (VIN): Sensitive/Private; Vehicle registration plate number: Sensitive/Private; Weight: Sensitive/Public; Zip/Postal codes: Sensitive/Public;

Storing documents in STORESECURE is easy. The user selects the type of document from a dropdown list, fills in the appropriate metadata and then uploads the associated document file. For example, if a user wishes to add their Texas driver's license they would start by scanning or photographing their physical issued driver's license. They would then go into STORESECURE, select the "Driver's License" category and then select "Driver's License US-TX" to specify a Texas driver's license. The application loads the correct Property Template with all the fields that are relevant for a Texas driver's license.

Users can enter document metadata using the Properties tab user interface, found on the right hand side of the screen. The layout presents all of the available data fields for a given document type, which is a combination of document category (i.e. Driver's License) and item type (i.e. Texas DL). All data entered in the Properties tab is stored in the database. Each property stored in the database has been assigned a security classification level, based on the information type and sensitivity. The security classification level determines whether the user's data is encrypted (or not) and also affects the user's overall personal risk rating. Since the Properties tabs always displays the information unencrypted, the user may not be aware of which of their sensitive data is being encrypted. For this reason, all encrypted fields have a small green lock icon to the right of the field.

The last field on the Properties tab is the "Security Class" which shows the overall document security classification assigned, which is assigned the highest rating (i.e. high water mark) of all of the metadata fields for the document. The user is able to override the predefined "Security Class" for the document and either increase or decrease the rating, if the user believes the document or data is a higher or lower sensitivity, value and/or criticality than the system specifies. Increasing or decreasing the security classification affects the overall personal risk rating, which affects the level of authentication required to for an individual to log into the system.

All data input fields in the Property tabs are specified in the database Property object. Each Property object specifies a data type (which affects the type of UI widget displayed), input constraints (e.g. length, min, max, format, etc.), a property type (which allows custom behavior such as repeating list, lookup lists, etc.) and a security classification. The Property object are reusable for multiple document types, for example City, State and ZIP Code property objects can be assigned to any number of documents that requires input of these fields.

A document type (e.g. Texas Driver's license) can have one or more Properties. Each property for a given document will have exactly one Property data value (e.g. Surname="Smith"), even though each Property object can be associated with many document (e.g. many document can have State property). Property values for fields that have a security class of "Highly Sensitive/Private" are automatically encrypted when a value is saved, and are automatically decrypted when the Property value is displayed in the User Interface (UI). Each property field added to the database has a predefined security classification rating based on its level of sensitivity, value and criticality to an individual. The Property database table which is used to define the behavior of a UI field contains the following attributes: Field (Description); PROP_NAME (Unique Property name); UI_LABEL (UI label to display to user); AUTHOR (User who created the object); DATATYPE (Data type, also specifies UI widget to use (e.g. date)); LENGTH (String maximum length); MIN (Minimum integer value); MAX (Maximum integer value); FORMAT (Format template); PROP_TYPE (Property type is used); SECURE_CLASS (Security classification (e.g. Highly Sensitive/Private)); IS_SYSTEM_OBJ (True=System object; else User defined object). Property Object for the Driver's License (DL) number field requires encryption, which increases the document's risk classification and ultimately increase the user's overall personal risk rating: Database Field (Metadata); PROP_NAME (dl); UI_LABEL (DL); AUTHOR (SmartVault); DATATYPE (string); LENGTH (8); MIN ((null)); MAX ((null)); FORMAT (99999999); CLASS ((null)); SECURITY_CLASS (25); and IS_SYSTEM_OBJ (true). Property Object for the Birth Date does not require encryption, but increases the document risk classification and user's overall personal risk rating: Database Field (Metadata); PROP_NAME (birth_date); UI_LABEL (Birth Date); AUTHOR (SmartVault); DATATYPE (date); LENGTH ((null)); MIN ((null)); MAX ((null)); FORMAT ((null)); CLASS ((null)); SECURITY_CLASS (10); and IS_SYSTEM_OBJ (true).

Property Templates are added to the database by associating one or more property fields with the template. The template represents the layout and order of all UI fields for a given document. The Property Template object also holds the overall document security classification rating which is assessed based on the highest value of all property fields. The user cannot change the pre-classified security classification of each individual property field, but they can increase or decrease the overall document security classification assigned to the Property Template. There are literally thousands of pre-defined Property Templates that have been added to the system for document types (e.g. birth certificates, credit cards, driver's licenses, insurance documents, legal documents, passports, etc.) and instance sub-types (e.g. Texas driver's license). For example just for driver's licenses, there are templates for each U.S. state (including Washington) and territory, as well as driver's license templates for Germany, U.K, Canada and Mexico.

All documents that are uploaded into SECURESTORE are encrypted with military grade encryption and are stored in a simple content management system called Simple File Archive (SFA) on a redundant Storage Area Network (SAN). Upon storing the document, the SFA returns the unique ID assigned to the file object. The document's object ID and associated document metadata are then stored in an enterprise database. The document and database storage are treated as a single indivisible transaction.

The SFA content management provides extremely fast millisecond access to store or retrieve document objects even with very large repositories with billions and billions of small to medium sized files. Since the SFA was specifically designed for the simple retrieval and storage of large numbers of files, file access is many time faster than most content management systems.

For simple storage and retrieve of documents, Enterprise Content Management (ECM) systems, (such as IBM FileNet, IBM DB2 Content Manager, EMC-Documentum Content Manger, Alfresco Document Management systems, etc.) are overkill and are slow due to the overhead of the complex feature sets. Most enterprise databases can easily manage content transactions, but typically they are not very good at large object (LOB) storage. By making the database and application data access modules handle all of the complexities of document management (e.g. transactional support, document versioning, ownership, ACLs, check in/out and record locking), the content management can be optimized to be light-weight and fast.

The SFA Content Manager is a simple document storage and retrieval system that: Provides extremely fast millisecond file storage and retrieval; Stores encrypted documents as standard files on a standard file system; Each user has their own repository partition that is separate from other users (useful for disabling, deleting, backing up or restoring of a user's account files); Files are stored based on checksum hash which means that identical files stored in different folders have multiple File records in the database, but only one physical file in the content repository (NOTE: Hash collisions are safeguarded and will never occur); Ability to manage billions of documents; and In conjunction with a database will pass ACID (Atomicity, Consistency, Isolation, Durability) tests.

The SFA Content Manager does not handle: Document versioning; the database handles multiple versions of the same document (which have different checksum hash codes); Transactional support; the database and application handles this; Ownership—SFA provides basic ownership due to each user having their own encrypted file repository, but ownership is not at a file by file level, nor does it track who was the creator of a document; the database handles this; Permission, Access Control Lists (ACLs) and sharing; the database and application handles this; Storage of file related metadata (e.g. original file name, file size, file extension, media type, create date, modification date, etc.); the database handles this; Check in/out record locking to prevent concurrent edits; the database and application handles this.

The SFA uses a specific folder structure on a standard (typically Linux ext4) file system. The base directory is the archive root and is typically named "archive". Contained in the base directory are a number of subdirectories to ensure good random distribution of user archive directories to ensure subdirectory limits are not exceeded (NOTE: the diagram to the right is a simplified diagram and omits these folders). Contained in these directories are the user archive directories, which are named the same as the user's logon ID. Each user has a separate folder that holds all of their encrypted files. Having the user's files in one location is useful for disabling or deleting a user's account or for backing up or restoring of their account files. All files for a given user are encrypted with the user's encryption key; no other user's encryption key can be used to decrypt the files.

From a file system perspective, all files stored in the SFA archive are owned by the application server user and have restrictive file permissions applied (e.g. the group and public file access is removed) to prevent any other O/S users from accessing the files.

The entire SFA content repository archive is stored on a redundant Storage Area Network (SAN) device. If any of the hard drive fails in the SAN, the other hard drives in the storage network essentially rebuild the data through a series of algorithms so no information is lost. In addition, the data on the hard drives is backed up every night and is redundantly stored in multiple secure facilities and on multiple devices within each facility.

All sensitive database fields and all documents stored in the product are encrypted using very strong generated keys and AES 256-bit military grade encryption to ensure optimum protection. The generated keys are stored encrypted in the user's profile in the database using one of two key management strategies that the user selects depending on their security requirements.

When a new account is setup a secret key is generated for the user and is stored encrypted in the user's profile. This generated key is very strong and highly random, and is much stronger than a user chosen password. The generated key is stored in the "USER_KEY" field in the User record:

In order to retrieve the user's generated key the "USER_KEY" field needs to be decrypted using either the server's key plus the user's logon ID, or the user's personal key. The SmartVault products support managed key and personal key encryption to tailor security to the individual's needs.

System managed key approach provides an excellent balance of security and convenience. For instance, encrypted documents can be shared with other family members and users can reset their password without losing access to their encrypted files. If files were encrypted using a personal key approach and the user forgets the password, then all encrypted files would be lost as they cannot be decrypted by either the user or by SmartVault.

When a user first sets up an account, they are asked whether they want to use a "Managed Key" or "Personal Key" strategy. System managed key approach is selected by default. System Managed Keys work as follows:

1. The server's secret encryption/decryption key is stored on the application server's file system in a password protected Java Cryptography Extension (JCE) key store;

2. The key store file is encrypted and has highly restrictive file system permissions. The decryption key is embedded in the SmartVault Java byte code;

3. When the application server is started, it decrypts the server's key store, retrieves the secret encryption/decryption key, and then caches the key in memory;

4. The application server opens a connection with the database in order to retrieve the user's profile record;

5. When a user wishes to view a file, the application uses a combination of the user's username and the server's secret key to decrypt the "USER_KEY" field in the user profile database record, to retrieve the user's secret key;

6. The user's secret key is a 256 bit key that was randomly generated to ensure a strong key with excellent random distribution;

7. The user's secret key is used by the content repository to decrypt and send the requested file to the users browser for display; and 8. The unencrypted data is never stored and is streamed directly from the server to the user's browser over a 256-bit SSL encrypted session.

One of the advantages of this approach is the ability to share files with other family members and authorized users. If a user shares a document with his spouse, an Access Control List (ACL) is setup granting permission to the other user to access the encrypted document. When the spouse accesses the document, the document owner's system managed key is retrieved and is used to proxy decrypt the document and display the document to the spouse.

Another advantage is the ability to reset the user's password with losing the ability to access the user's encrypted data and documents. In this scenario the user would call technical support to get the password reset. After sufficiently identifying the user on the phone, the support personal would manually reset the user's password to a temporary value. The user would be forced to change the password the next time they log into the system.

Personal key approach uses the user's secret password, which is only known to the user. Personal key encryption offers unsurpassed security, but at the cost of losing some convenience. When a user first sets up an account, they are asked whether they want to use a "Managed Key" or "Personal Key" strategy. The managed key approach is selected by default. If the user chooses "Personal Key", they will be prompted with a warning dialog stating the fact that this approach does not support file sharing and key recovery. The user can chose to continue to select "Personal Key" approach or cancel and use "Managed Key" approach. Personal Keys work as follows:

1. The personal secret key is the same as the password the user uses to log into the system. Once the user logs into the system, the personal secret key is cached in memory;

2. The application server opens a connection with the database in order to retrieve the user's profile record;

3. When a user wishes to view a file, the application uses the user's personal secret key (e.g. logon password) to decrypt the "USER_KEY" field in the user profile database record, to retrieve the user's secret key;

4. The user's secret key is a 256 bit key that was randomly generated to ensure a strong key with excellent random distribution;

5. The user's secret key is used by the content repository to decrypt and send the requested file to the users browser for display; and 6. The unencrypted data is never stored and is streamed directly from the server to the user's browser over a 256-bit SSL encrypted session.

Each user has been assigned a random system generated 256-bit secret key, which is stored encrypted in the user's profile in the "USER_PASS" field. This password is different from the password the user uses to authenticate when they log into the system. The generated secret key is very strong and highly random, and is much stronger than a user chosen password. The assigned secret key is used for the encryption and decryption of all documents stored in STORESECURE and sensitive data stored in the database (with the exception of the "USER_PASS" field). Since the generated user's key is stored encrypted in the user's profile in the database, it must first be retrieved and decrypted before any document or data can be encrypted or decrypted. If the default "Managed Key" approach is used, then the user's username and system's secret key is used to retrieve the user's secret key. If "Personal Key" approach is used, then the user's logon password is used to retrieve the user's secret key. This option is only available for the "Managed Key" approach. In this scenario the user would contact technical support to get the logon Single Sign-On (SSO) password reset. The support personnel would require that the user on the phone to prove their identity by asking challenge questions. Once authenticated, they would manually reset the user's password to a temporary value. The user is sent the temporary password via email or SMS and is forced to change the password the next time they log into the system. Since in the "Managed Key" approach the user's encryption key is not directly tied to the user's logon Single Sign-On (SSO) password, changing the user's logon password will not affect the user's ability to decrypt/encrypt documents and encrypted fields in the database. If the "Personal Key" approach is used and the user forgets their password, neither the user nor SmartVault will be able to decrypt data and files. In this case, all data will be lost and the user's account will need to be reset by deleting and recreating the account before the user can use it again.

The user has the ability to change their logon password at any time regardless of which key management approach is being used. For the "Managed Key" approach, changing the logon password is handled in a standard way and since the logon password is not directly ties to the password used to decrypt the user's encryption key, it will not affect the user's ability to encrypt or decrypt file. For the "Personal Key" approach, changing the logon password will also require the secret key stored in the user's profile be retrieved from the database and decrypted, then encrypted with the new password and stored back into the database. Since the underlying user's generated key (that is used for encryption and decryption) never changes, there is no requirement to visit each file and decrypt and encrypt with a new key. Only the key for the encryption of the generated key field is changed. If required, an SmartVault support person can also change the user's generated password. Since changing the generated password is very time consuming for accounts with large amounts of files, the account is required to be locked (to prevent access to files during this process). Each file needs to be loaded, decrypted using the old secret key, then encrypted using the new key and stored. Secret keys are cached in session on the server for performance reason and are automatically removed when the user logs out, or the user's session expires (typically after 15 minutes). Key information is never stored on the file system and is not available to any other user other than the currently logged in user.

SmartVault uses a 256-bit military grade Advanced Encryption Standard (AES) encryption for the encryption of all files and encrypted database fields. AES is a National Institute of Standards and Technology (NIST) encryption standard and is a successor to DES encryption. It was created from the Rijndael cipher, which was chosen from 15 encryption designs after multi-year selection process. AES algorithm is describe in the FIPS PUB 197 and is approved by FIPS 140-2 in conjunction with the cryptographic module. AES is currently used by the military and other government agencies. All known attacks against the AES encryption algorithm are considered computationally infeasible.

AES encryption supports 128,192 and 256 bit keys. The longer the key, the slower the decryption process, but the more secure the encryption. SmartVault only uses the stronger 256 bit key. Encryption with keys larger than 128 bits are restricted by the United States government. This requires the installation of the Java Cryptography Extension (JCE) Unlimited Strength Jurisdiction Policy Files on the server to remove these restrictions. AES is a block cipher, which means the encryption/decryption process always operates on units or "blocks" that are a fixed number of bytes in size. In the case of AES, the block size is 128 bits. For extra security, Cipher Block Chaining (CBC) mode is utilized. The extra security comes from the fact that the encryption of a given block is dependent on the bits from the previous encrypted block chain. An Initialization Vector (IV) is used to seed the first block in the chain. The IV is stored with the encrypted file, since the IV does not need to be secret and does not degrade the security of the encryption algorithm.

The SmartVault UNIVERSALWORKSPACE application portal uses an innovative risk based approach to authenticate users. The more sensitive documents, the higher the risk, the more complex the authentication required to authenticate the user. Casual users with minimal sensitive document can log into the system using basic authentication using a Single Sign-On token (or simple username/password if application is standalone). Users who manage all of their sensitive life documents will log in using two-factor authentication, which consists of the base username/password authentication (something the user knows) with a physical authentication device (something the user has) that generates a One Time Password (OTP).

Each document that is added to the system is associated with a Property Template and is assigned a document risk classification. The document risk classification is a number between 0 and 25, with 25 being the highest risk. The document risk classification is typically based on the risk classification of each property (i.e. field) in the template. For instance "City" field is classified "Non-Sensitive/Public" and "Credit Card Number" is classified "Highly Sensitive/Private".

Each Property field in a Property Tab is assigned a risk classification value. The overall document risk classification is assigned the highest rating (i.e., high water mark) of all of the Properties fields. If the Properties tab property field risks are 25, 5, 5, 10, 5, 0, 0, 0, then the overall document risk rating is 25.

The overall personal risk rating is a numeric value that represents the combined sensitivity of all documents that a user has added to their account. This risk rating affects the level of authentication required by the user to prove their identity and allow access to the SmartVault UNIVERSALWORKSPACE Portal. The higher the overall personal risk rating, the higher the authentication requirement.

Overall Risk Rating Authentication Requirements:

(1) 0-70: Standard Single Sign-On (SSO)—Up to 2 highly sensitive documents;

(2) 71-120: SSO+Challenge/response questions—Up to 4 highly sensitive documents;

(3) 121-220: SSO+Secondary password/phrase—Up to 8 highly sensitive documents; and (4) 221 or higher: SSO+One Time Password (OTP) two factor authentication.

The idea of risk based authentication is that casual users of the system, who may not be comfortable with having highly sensitive documentation online, will only be required to enter their basic single sign-on username and password and will not be inconvenienced by entering any additional secondary authentication. Power users who are comfortable with storing and managing their sensitive life documents online will be required to enter secondary authentication. The highest level of secondary authentication is the two factor authentication, which requires the user to have on their person a physical authentication device in addition to the standard SSO username and password. The security classification of each data field for a given document is predefined and cannot be changed, but the overall document risk assessment (based on these classifications) can be modified.

At any time a user may increase the risk assessment of a document by one level, if the user feels that the security assessment is too low for the type of information that is stored. For instance, home phone numbers are assessed as "Sensitive/Public", but the user may feel that the phone number should be assessed as "Sensitive/Private" and may wish to increase the document risk rating to reflect this fact. The user is also able to decrease the risk assessment of a document by one, but it is strongly discouraged to do so. In order to reduce the rating, the use must sign a disclaimer stating that they understand the risk of decreasing the rating but choose to do so anyway. When a user decreases the security classification to a lower level, a dialog is displayed explaining the reasons for the classification and the user is then required to click a Clickwrap agreement stating they understand the risks and wish to proceed. Increasing or decreasing the document security classification affects the overall personal risk rating, which affects the level of authentication required to for an individual to log into the system.

SmartVault typically uses Single Sign-On (SSO) for the default authentication of member users. SSO allows users access to multiple trusted systems without having to authenticate for each system. Single Sign-On typically consists of the user authenticating with a standard username and password, and authentication is often handled by a Lightweight Directory Access Protocol (LDAP) directory server.

Personal challenge questions consist of set of 10 or more questions and answers that are a combination of both system-defined and user-defined questions along with their corresponding personal answers that are used for secondary authentication. Users are required to correctly answer two or more randomly selected challenge questions before being granted access to the system.

The secondary passphrase is a strong, user or system specified, restrictive password that is used as a secondary authentication to gain access to the system. Although the user has the option to pick their own passphrase, the system ensures the passphrase is very strong by enforcing that the password meets strict password policies. The user also has the option of having the system continuously generate strong passwords until the user selects a password they wish to use. Secondary passwords must different from the user's SSO password, must be a minimum of 15 characters and contain at least three of: lowercase characters, uppercase characters, numbers, punctuation or special symbols. The password or phase cannot be dictionary words, names of family members, pets, friends, co-workers, birthdates, anniversaries and personal information such as ID numbers, address or phone numbers, etc.

The highest level of risk-based authentication in the SmartVault product set is the two factor authentication. This form of authentication requires the user to present a username and password (i.e. something they know) and a physical key chain authentication token (i.e. something they have). The authentication token emits One Time Passwords (OTP) either using a standard USB or via a wireless connection using either NFC (Near Field Communication) or Bluetooth. The authentication token can be used with Windows, Mac and Linux systems, as well as mobile technologies such as iOS devices (e.g. iPhone, iPad), Android, RIM, Windows Phone and Symbian. The mobile authentication is typically handled through NFC contactless technology (NDEF type 4). SmartVault will provide a two factor technology capable of generating one time passwords, for a system or mobile device of the user's choice, free of charge to all users with accounts with a high personal risk rating.

Additional Information

FIG. 1 is a first collection of graphical information pertaining to the foregoing technical and security sections.

FIG. 2 is a second collection of graphical information pertaining to the foregoing technical and security sections.

FIG. 3 is a third collection of graphical information pertaining to the foregoing technical and security sections.

FIG. 4 is a block diagram of an example computing environment that may be used in conjunction with example implementations and aspects. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to Supplemental FIG. 4, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in Supplemental FIG. 4 by dashed line 506.

Computing device 500 may have additional features/functionality. For example, computing device 500 may include additional storage (removable and/or non-removable) including, but not limited to, magnetic or optical disks or tape. Such additional storage is illustrated in Supplemental FIG. 4 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc., may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An electronic safety deposit box comprising:
   a memory; and
   a hardware processor for:
     receiving and storing at least one item of electronic data in the electronic safety deposit box for a user;
     determining a current level of security for the electronic safety deposit box and a set of corresponding credentials necessary for the user to access the electronic safety deposit box, wherein the corresponding credentials comprise at least one dynamic credential that changes with each access attempt;
     prompting the user to provide the set of corresponding credentials for access to the electronic safety deposit box;
     validating that the user is authorized access to the electronic safety deposit box and to the at least one item of electronic data stored in the electronic safety deposit box; and
     granting access to the at least one item of electronic data in the electronic safety deposit box;
     logging audit information for the user's access to the at least one item of electronic data in the electronic safety deposit box wherein every aspect of a session pertaining to the user' access to said at least one item of electronic data is recreatable using the logged audit information.

2. The system of claim 1 further comprising delivering a reminder to the user to complete a task associated with the at least one item of electronic data stored in the electronic safety deposit box.

3. The system of claim 1 further comprising permitting the user to enable or disable at least one supplemental service.

4. The system of claim 1 wherein validating that the user is authorized access to the electronic safety deposit box is based on the set of corresponding credentials provided by the user.

5. The system of claim 4 wherein validating that the user is authorized access to the at least one item of electronic data stored in the electronic safety deposit box is based on the set of corresponding credentials provided by the user.

6. The system of claim 1 wherein the at least one item of electronic data in the electronic safety deposit box is stored in an encrypted form.

7. The system of claim 1 further comprising performing heuristic analysis of the user's interactions with the electronic safety deposit box.

8. A method for causing a processor to store an item of electronic data, the method comprising:
   receiving and storing at least one item of electronic data in the electronic safety deposit box for a user;
   determining a current level of security for the electronic safety deposit box and a set of corresponding credentials necessary for the user to access the electronic safety deposit box, wherein the corresponding credentials comprise at least one dynamic credential that changes with each access attempt;
   prompting the user to provide the set of corresponding credentials for access to the electronic safety deposit box;
   validating that the user is authorized access to the electronic safety deposit box and to the at least one item of electronic data stored in the electronic safety deposit box; and
   granting access to the at least one item of electronic data in the electronic safety deposit box;
   logging audit information for the user's access to the at least one item of electronic data in the electronic safety deposit box wherein every aspect of a session pertaining to the user' access to said at least one item of electronic data is recreatable using the logged audit information.

9. The method of claim 8 further comprising delivering a reminder to the user to complete a task associated with the at least one item of electronic data stored in the electronic safety deposit box.

10. The method of claim 8 further comprising permitting the user to enable or disable at least one supplemental service.

11. The method of claim 8 wherein validating that the user is authorized access to the electronic safety deposit box is based on the set of corresponding credentials provided by the user.

12. The method of claim 11 wherein validating that the user is authorized access to the at least one item of electronic data stored in the electronic safety deposit box is based on the set of corresponding credentials provided by the user.

13. The method of claim 8 wherein the at least one item of electronic data in the electronic safety deposit box is stored in an encrypted form.

14. The method of claim 8 further comprising performing heuristic analysis of the user's interactions with the electronic safety deposit box.

15. A non-transitory computer-readable storage medium comprising computer-readable instructions for an electronic safety deposit box, the computer-readable instructions comprising instructions that cause a processor to:
   receive and store at least one item of electronic data in the electronic safety deposit box for a user;
   determine a current level of security for the electronic safety deposit box and a set of corresponding credentials necessary for the user to access the electronic safety deposit box, wherein the corresponding credentials comprise at least one dynamic credential that changes with each access attempt;
   prompt the user to provide the set of corresponding credentials for access to the electronic safety deposit box;

validate that the user is authorized access to the electronic safety deposit box and to the at least one item of electronic data stored in the electronic safety deposit box; and grant access to the at least one item of electronic data in the electronic safety deposit box;

log audit information for the user's access to the at least one item of electronic data in the electronic safety deposit box wherein every aspect of a session pertaining to the user' access to said at least one item of electronic data is recreatable using the logged audit information.

16. The computer-readable storage medium of claim 15 further comprising computer-readable instructions that cause the processor to deliver a reminder to the user to complete a task associated with the at least one item of electronic data stored in the electronic safety deposit box.

17. The computer-readable storage medium of claim 15 further comprising computer-readable instructions that cause the processor to permit the user to enable or disable at least one supplemental service.

18. The computer-readable storage medium of claim 15 further comprising computer-readable instructions that cause the processor to store in encrypted form the at least one item of electronic data in the electronic safety deposit box.

19. The computer-readable storage medium of claim 15 further comprising computer-readable instructions that cause the processor to:

validate that the user is authorized access to the electronic safety deposit box and the at least one item of electronic data stored in the electronic safety deposit box based on the set of corresponding credentials provided by the user; and perform heuristic analysis of the user's interactions with the electronic safety deposit box.

20. The computer-readable storage medium of claim 19 further comprising computer-readable instructions that, for the logged audit information, enable every aspect of a session pertaining to the user' access to said at least one item of electronic data to be recreatable.

* * * * *